(12) United States Patent
Lim et al.

(10) Patent No.: US 11,538,268 B2
(45) Date of Patent: Dec. 27, 2022

(54) FINGERPRINT SENSOR PACKAGE AND SMARTCARD INCLUDING THE SAME

(71) Applicant: Samsung Electronics Co., Ltd., Suwon-si (KR)

(72) Inventors: Jaehyun Lim, Hwaseong-si (KR); Younghwan Park, Hwaseong-si (KR); Kwangjin Lee, Bucheon-si (KR); Inho Choi, Seoul (KR); Hyuntaek Choi, Cheonan-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/500,434

(22) Filed: Oct. 13, 2021

(65) Prior Publication Data

US 2022/0129657 A1 Apr. 28, 2022

(30) Foreign Application Priority Data

Oct. 28, 2020 (KR) .......................... 10-2020-0141450

(51) Int. Cl.
*G06V 40/13* (2022.01)

(52) U.S. Cl.
CPC ...... *G06V 40/1306* (2022.01); *G06V 40/1329* (2022.01)

(58) Field of Classification Search
CPC ........... G06V 40/1306; G06V 40/1329; G06V 40/13; H01L 23/528; H01L 23/13; H01L 23/31; H01L 23/481; H01L 23/49838; H01L 23/5286; H01L 23/60; H01L 23/62; H01L 23/642; H01L 24/06; H01L 24/00
See application file for complete search history.

(56) References Cited

U.S. PATENT DOCUMENTS

| 9,582,704 B2 | 2/2017 | Jagemalm et al. |
| 2012/0049309 A1* | 3/2012 | Kiyomoto ........ G06K 19/07728 257/434 |

(Continued)

FOREIGN PATENT DOCUMENTS

| KR | 10-2017-0084941 A | 7/2017 |
| KR | 10-2017-0098476 A | 8/2017 |

(Continued)

*Primary Examiner* — Premal R Patel
(74) *Attorney, Agent, or Firm* — Harness, Dickey & Pierce, P.L.C.

(57) ABSTRACT

A fingerprint sensor package includes a package substrate including an upper surface in which a sensing region and a peripheral region surrounding the sensing region are defined, and a lower surface facing the upper surface; a plurality of first sensing patterns located are arranged in the sensing region, are apart from each other in a first direction, and extend in a second direction crossing the first direction; a plurality of second sensing patterns that are arranged in the sensing region, are apart from each other in the second direction, and extend in the first direction; a coating member covering the sensing region; an upper ground pattern in the peripheral region and apart from the coating member to surround the coating member in the first and second directions; and a controller chip on the lower surface of the package substrate; and a plurality of capacitors.

20 Claims, 20 Drawing Sheets

(56) References Cited

U.S. PATENT DOCUMENTS

| | | | | |
|---|---|---|---|---|
| 2016/0148034 A1* | 5/2016 | Kremin | ............. | G06V 40/1306 |
| | | | | 382/124 |
| 2017/0336910 A1* | 11/2017 | Han | ................... | G06F 3/04164 |
| 2019/0018540 A1* | 1/2019 | Ko | ....................... | G06F 3/0446 |
| 2019/0286868 A1 | 9/2019 | Suwald | | |
| 2020/0311509 A1* | 10/2020 | Benkley, III | ............ | G06F 21/32 |
| 2021/0049439 A1* | 2/2021 | Finn | ................. | G06K 19/07354 |
| 2021/0117526 A1* | 4/2021 | Lisk | .................... | G06Q 20/405 |

FOREIGN PATENT DOCUMENTS

| | | |
|---|---|---|
| KR | 10-2018-0016239 A | 2/2018 |
| KR | 10-2018-0038971 A | 4/2018 |

\* cited by examiner

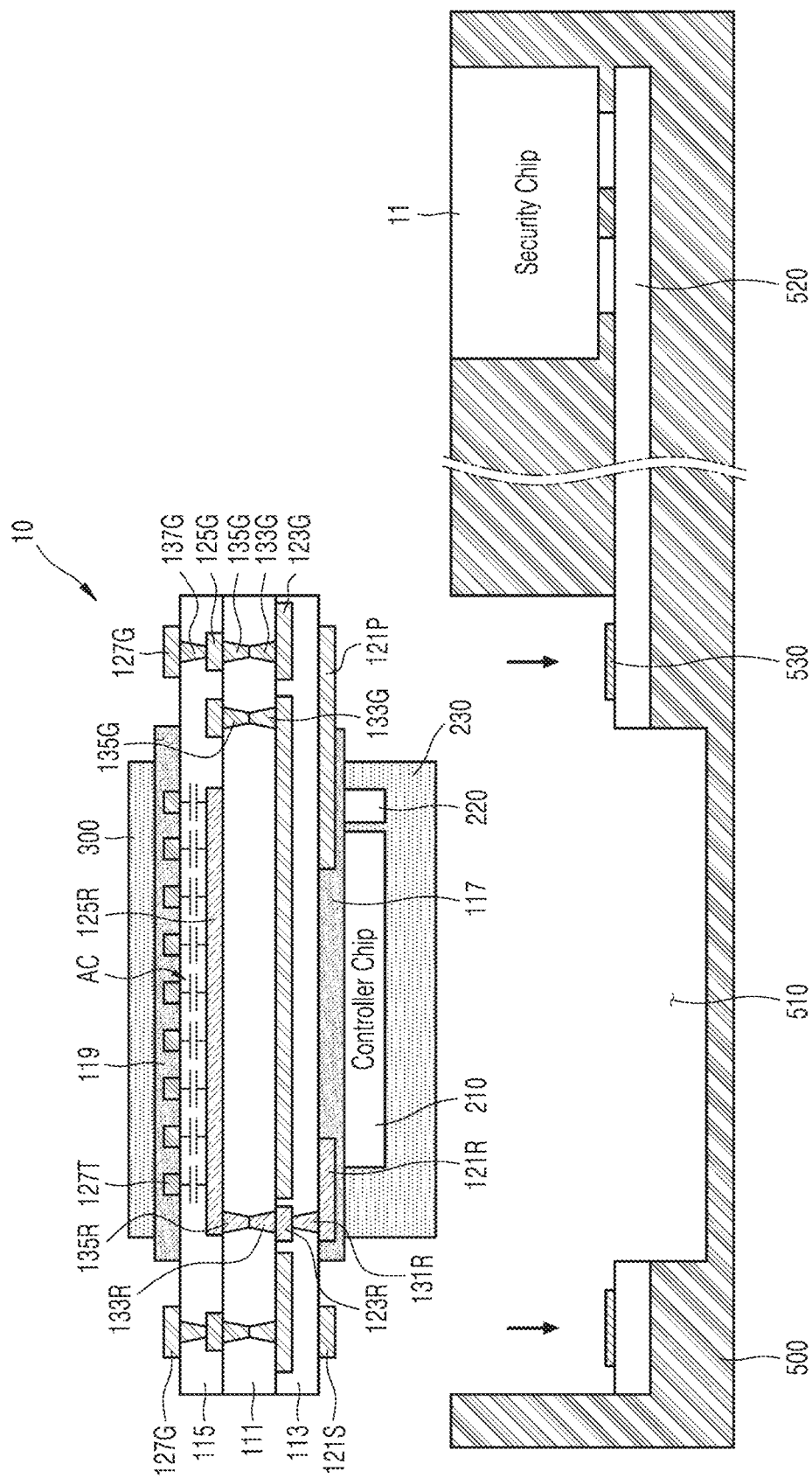

FINGERPRINT SENSOR PACKAGE AND SMARTCARD INCLUDING THE SAME

CROSS-REFERENCE TO RELATED APPLICATION

This application is based on and claims priority under 35 U.S.C. § 119 to Korean Patent Application No. 10-2020-0141450, filed on Oct. 28, 2020, in the Korean Intellectual Property Office, the disclosure of which is incorporated by reference herein in its entirety.

BACKGROUND

At least some example embodiments of the inventive concepts relate to a fingerprint sensor package and a smartcard including the same, and more particularly, to a fingerprint sensor package including a ground pattern and a smartcard including the fingerprint sensor package.

Fingerprint recognition technology is used to reduce or prevent several security accidents by providing for a registration and authentication procedure conducted by recognizing a fingerprint of a user. In particular, fingerprint recognition technology is applied to network protection of individuals and organizations, protection of various contents and data, safe access to financial information, or the like. A fingerprint sensor obtains fingerprint information of a user by using an optical method, an electrostatic capacitive method, an ultrasonic method, a thermal sensing method, or the like. The recent trend in the fingerprint sensor industry is achieving a compact size and a thin thickness of products and enabling lower costs at the same time. Accordingly, a fingerprint sensor package is required to maintain the reliability and sensitivity of fingerprint information acquisition, have a reduced overall size and height, and have economic feasibility.

SUMMARY

At least some example embodiments of the inventive concepts provide a fingerprint sensor package having high reliability to reduce or prevent financial accidents due to theft or loss of a smartcard, and a smartcard including the fingerprint sensor package.

Objectives of example embodiments of the inventive concepts are not limited to the above described ones, and other objectives that are not mentioned will be clearly understood by those skilled in the art from the following description.

According at least one example embodiment of the inventive concepts, a fingerprint sensor package includes a package substrate including an upper surface in which a sensing region and a peripheral region surrounding the sensing region are defined, and a lower surface facing the upper surface; a plurality of first sensing patterns located are arranged in the sensing region, are apart from each other in a first direction, and extend in a second direction crossing the first direction; a plurality of second sensing patterns that are arranged in the sensing region, are apart from each other in the second direction, and extend in the first direction; a coating member covering the sensing region; an upper ground pattern in the peripheral region and apart from the coating member to surround the coating member in the first and second directions; and a controller chip on the lower surface of the package substrate; and a plurality of capacitors, wherein the plurality of first sensing patterns and the plurality of second sensing patterns are apart from each other in a third direction perpendicular to the first and second directions such that each capacitor from among the plurality of capacitors includes a sensing pattern from among the plurality of first sensing patterns as a first conductor and a sensing pattern from among the plurality of second sensing patterns as a second conductor.

According to at least one example embodiment of the inventive concepts, a fingerprint sensor package includes a package substrate in which a sensing region and a peripheral region surrounding the sensing region are defined, wherein each of corners of the package substrate has a round rectangular planar shape; and a controller chip mounted on the package substrate and configured to determine whether a recognized fingerprint corresponds to a registered fingerprint, wherein the package substrate includes a base layer; a coating member, an upper protection layer between the coating member and an upper surface of the base layer, and an upper insulating layer between the upper protection layer and the upper surface of the base layer; a molding member, a lower protection layer between the molding member and a lower surface of the base layer, and a lower insulating layer between the lower protection layer and the lower surface of the base layer; first conductive patterns, at least some of which are covered by the lower protection layer, the first conductive patterns including first ground patterns, power patterns, signal patterns, and first sensing pads; second conductive patterns covered by the lower insulating layer and including second ground patterns connected to the first ground patterns and second sensing pads connected to the first sensing pads; third conductive patterns covered by the upper insulating layer and including third ground patterns connected to the second ground patterns, first sensing patterns that are connected to some of the second sensing pads and are apart from each other in a first direction and extend in a second direction crossing the first direction, and third sensing pads connected to other ones of the second sensing pads; and fourth conductive patterns, at least some of which are covered by the upper protection layer, the fourth conductive patterns including fourth ground patterns connected to the third ground patterns and second sensing patterns that are connected to the third sensing pads and are apart from each other in the second direction and extend in the first direction, wherein the first and second sensing patterns are in the sensing region, wherein the controller chip is in the molding member, and wherein the fourth ground patterns are in the peripheral region and are apart from the coating member to surround the coating member in the first and second directions.

According to at least one example embodiment of the inventive concepts, a smartcard includes a card main body having a groove area; a security chip storing financial information; and a fingerprint sensor package configured to sense a fingerprint of a user and transmit a signal regarding a sensing result to the security chip, wherein the fingerprint sensor package includes a package substrate having an upper surface in which a sensing region and a peripheral region surrounding the sensing region are defined and a lower surface facing the upper surface; a plurality of first sensing patterns that are in the sensing region, are apart from each other in a first direction, and extend in a second direction crossing the first direction; a plurality of second sensing patterns that are in the sensing region, are apart from each other in the second direction, and extend in the first direction; a coating member covering the sensing region; an upper ground pattern that is in the peripheral region and apart from the coating member to surround the coating member in the first and second directions; and a plurality of capacitors, wherein the plurality of first sensing patterns and the plurality of second sensing patterns are apart from each other in a third direction perpendicular to the first and second directions such that each capacitor from among the plurality of capacitors includes a sensing pattern from among the plurality of first sensing patterns as a first conductor and a sensing pattern from among the plurality of second sensing patterns as a second conductor.

According to at least one example embodiment of the inventive concepts, there is provided a smartcard including: a card substrate; a security chip mounted on the card substrate and storing financial information; a fingerprint sensor package mounted on the card substrate and configured to sense a fingerprint of a user and transmit a signal regarding a sensing result to the security chip; a controller chip mounted in fingerprint sensor package and configured to determine whether a recognized fingerprint corresponds to a registered fingerprint; and a passive element mounted in the fingerprint sensor package and arranged around the controller chip, wherein the fingerprint sensor package includes: a sensing region configured to sense a fingerprint of the user; a coating member covering the sensing region; and a peripheral region surrounding the coating member and including an upper ground pattern for removing sensing noise generated by the user, wherein the upper ground pattern includes a closed line that is apart from the coating member and has a uniform width.

BRIEF DESCRIPTION OF THE DRAWINGS

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

FIGS. 11A through 11F illustrate a method of manufacturing a smartcard according to at least some example embodiments of the inventive concepts, in a process order.

DETAILED DESCRIPTION OF EXAMPLE EMBODIMENTS

Figure 1:
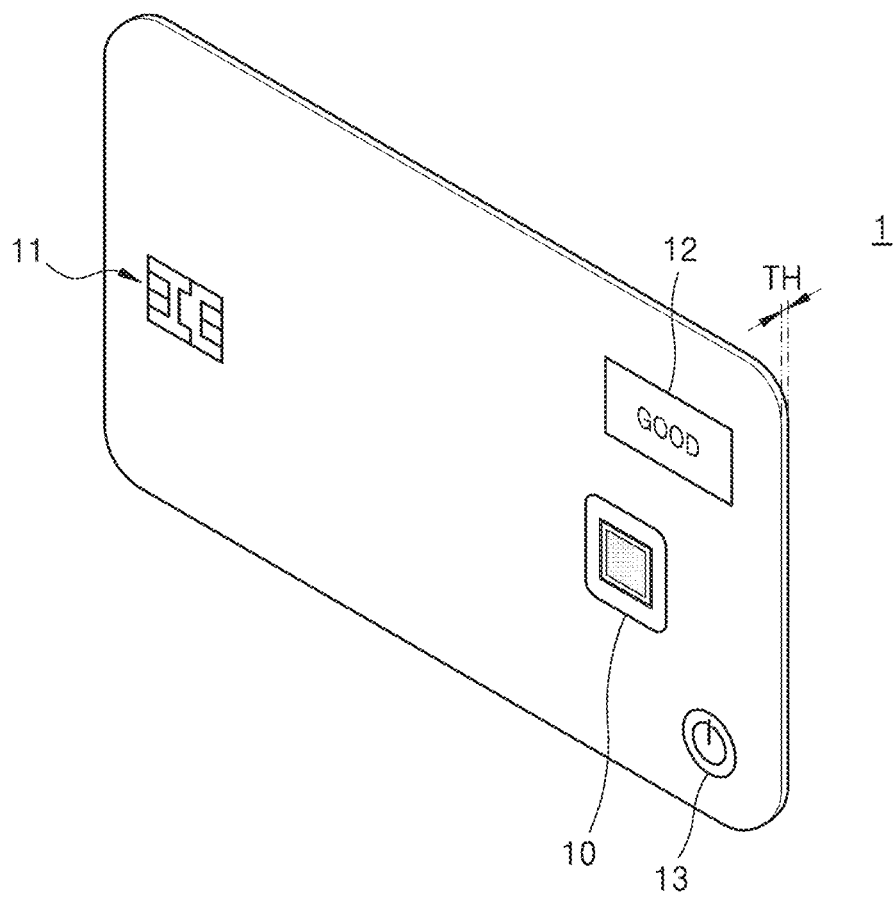
FIG. 1 is a schematic perspective view illustrating a smartcard according to at least some example embodiments of the inventive concepts.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

FIG. 1 is a schematic perspective view illustrating a smartcard according to example embodiments.

Referring to FIG. 1, a smartcard 1 may include a fingerprint sensor package 10, a security chip 11, a display unit 12, and a power button 13.

The smartcard 1 may further include information displayed on a credit card or a debit card in the related art, such as a card number identifier, an expiration date identifier, a user name, or the like. The smartcard 1 may further include a radio frequency (RF) chip.

The fingerprint sensor package 10 may recognize a user's fingerprint that a user brought into contact with a fingerprint sensor. The fingerprint sensor package 10 may determine whether the recognized fingerprint corresponds to a registered fingerprint by comparing the recognized fingerprint with the registered fingerprint. The fingerprint sensor package 10 may operate after the smartcard 1 is converted into an on state.

The security chip 11 may store encoded financial information. When the recognized fingerprint corresponds to the registered fingerprint, the security chip 11 may authorize the user of the smartcard 1 to pay. For example, the smartcard 1 may reduce or prevent financial accidents by theft or loss as the security chip 11 authorizes a user to pay, based on a result of recognition by using the fingerprint sensor package 10.

The display unit 12 may display whether the recognized fingerprint corresponds to a registered fingerprint, an on/off state, or the like. The display unit 12 may display characters, numbers, special symbols, or the like, and may further include a light-emitting portion as necessary. However, the display unit 12 may not be included according to a type of the smartcard 1.

The power button 13 may be used to turn on or off the smartcard 1. The smartcard 1 in an off state may be converted into an on state by controlling the power button 13, and the smartcard 1 in an on state may be converted into an off state by controlling the power button 13. Also, when a set period of time passes after the smartcard 1 is converted into an on state, the smartcard 1 may be automatically converted into an off state. However, the power button 13 may not be included according to a type of the smartcard 1.

In some example embodiments, a thickness TH of the smartcard 1 may be in a range of about 0.5 mm to about 1 mm. Also, a thickness TH of the smartcard 1 may be about 0.84 mm or less according to the international standards. For example, the thickness TH of the smartcard 1 may be about 0.76 mm or less.

The smartcard 1 according to the present example embodiments may include the fingerprint sensor package 10 and have a thickness similar to that of a credit card or a debit card of the related art, thus providing a high level of user experience. In addition, a cross-sectional view of the smartcard 1 of the present example embodiments may be substantially identical to that schematically illustrated in FIG. 11F.

FIGS. 2A through 2D illustrate a fingerprint sensor package according to example embodiments.

Figure 2A:
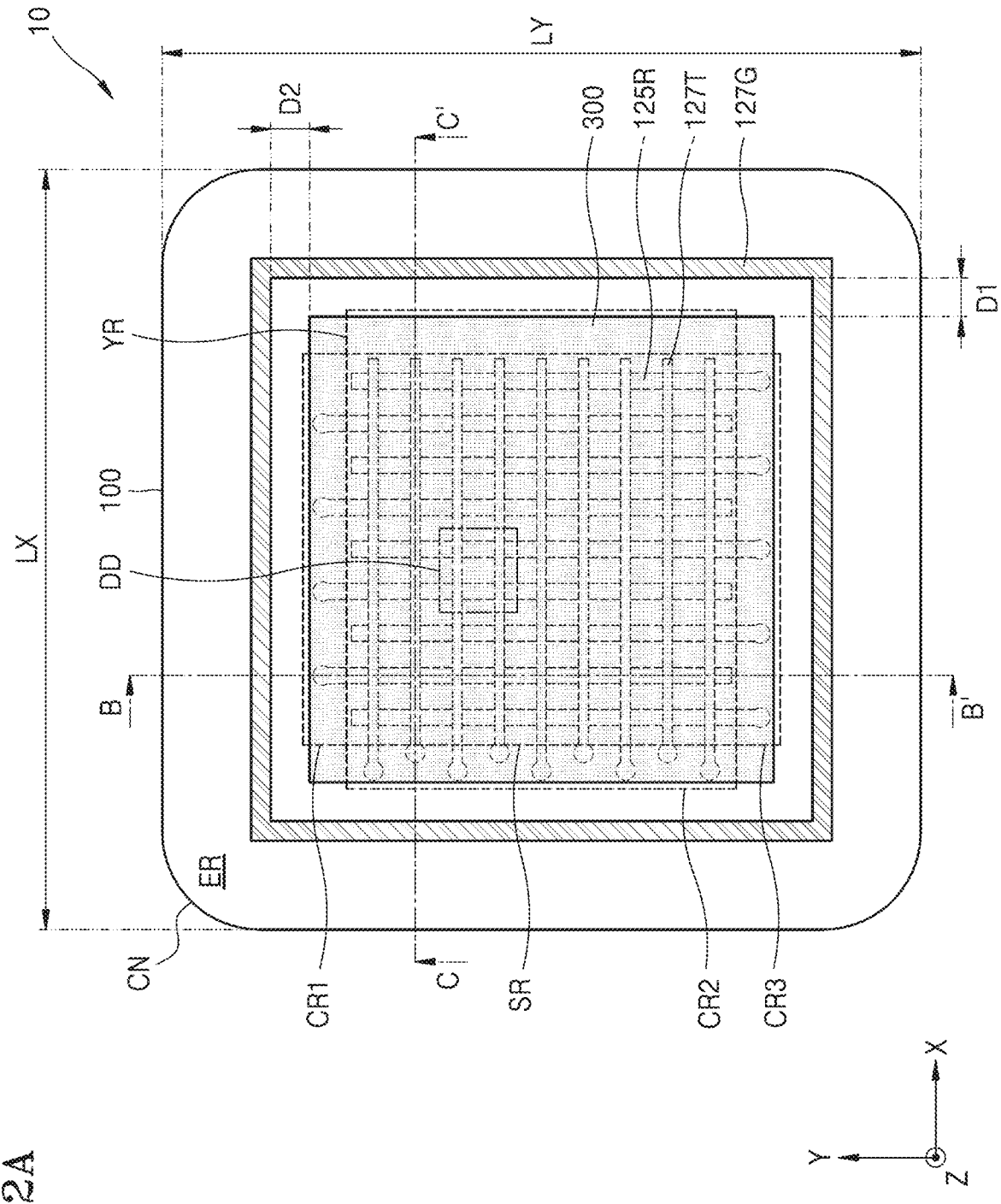
FIGS. 2A through 2D illustrate a fingerprint sensor package according to at least some example embodiments of the inventive concepts.
Figure 2B:
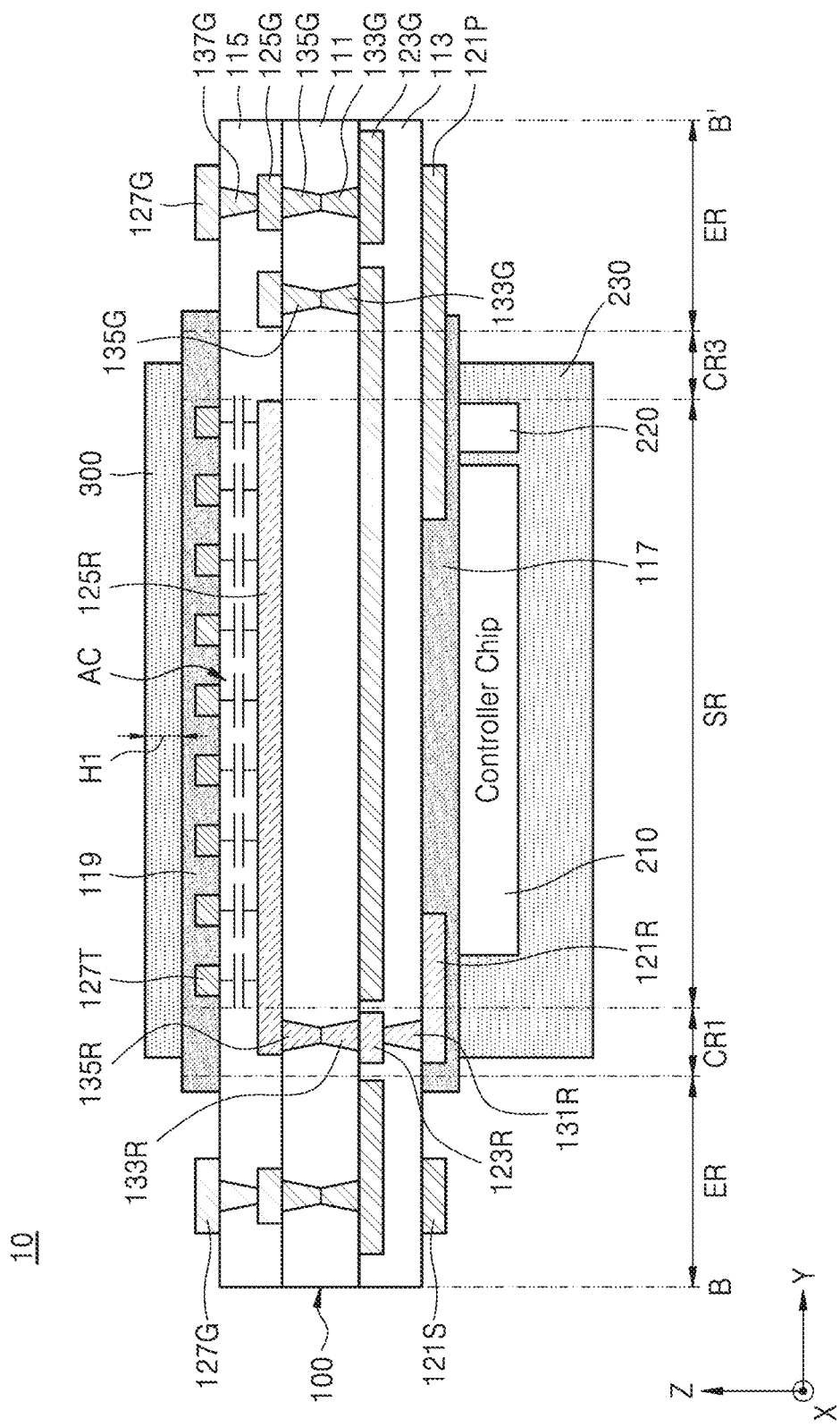
Figure 2C:
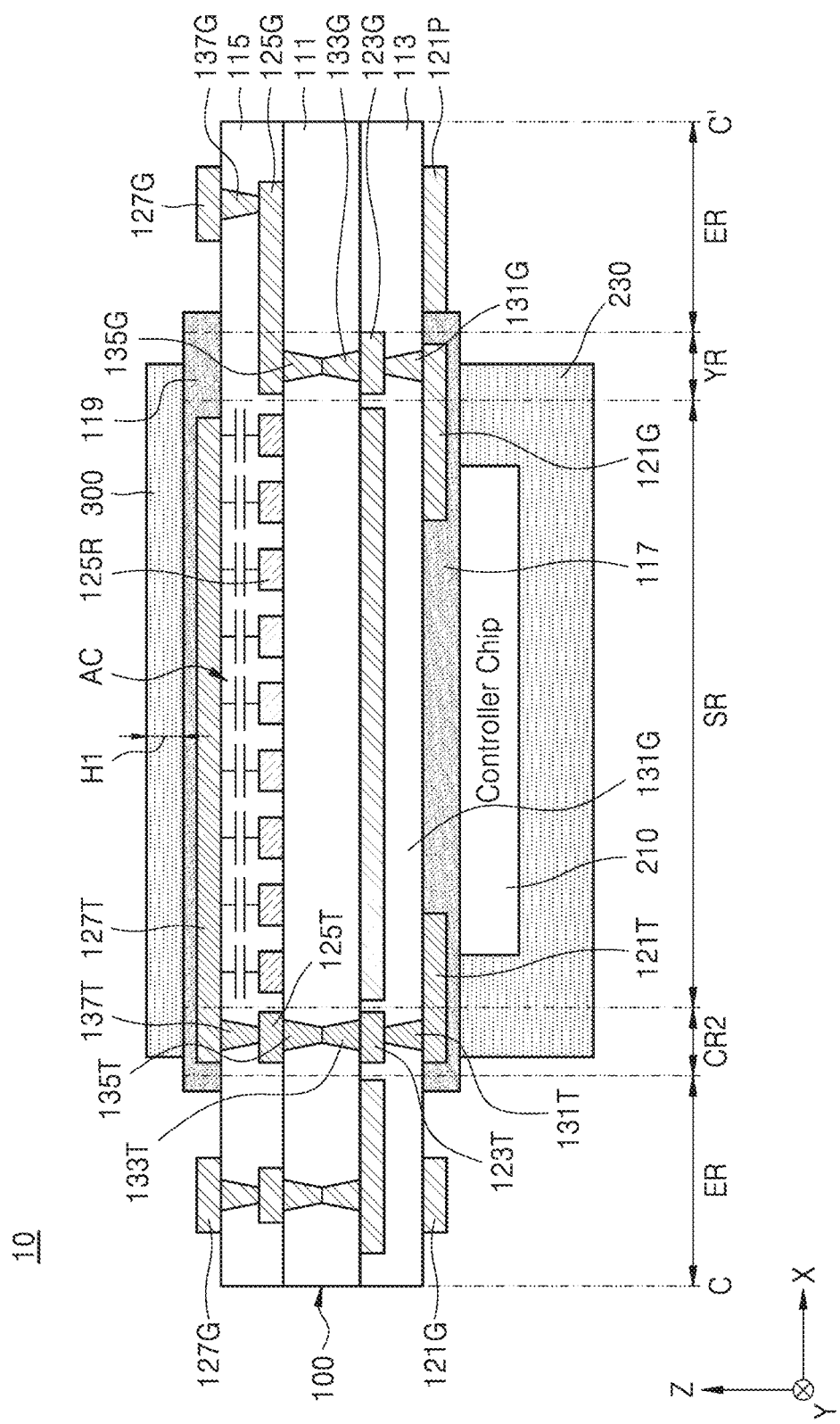
Figure 2D:
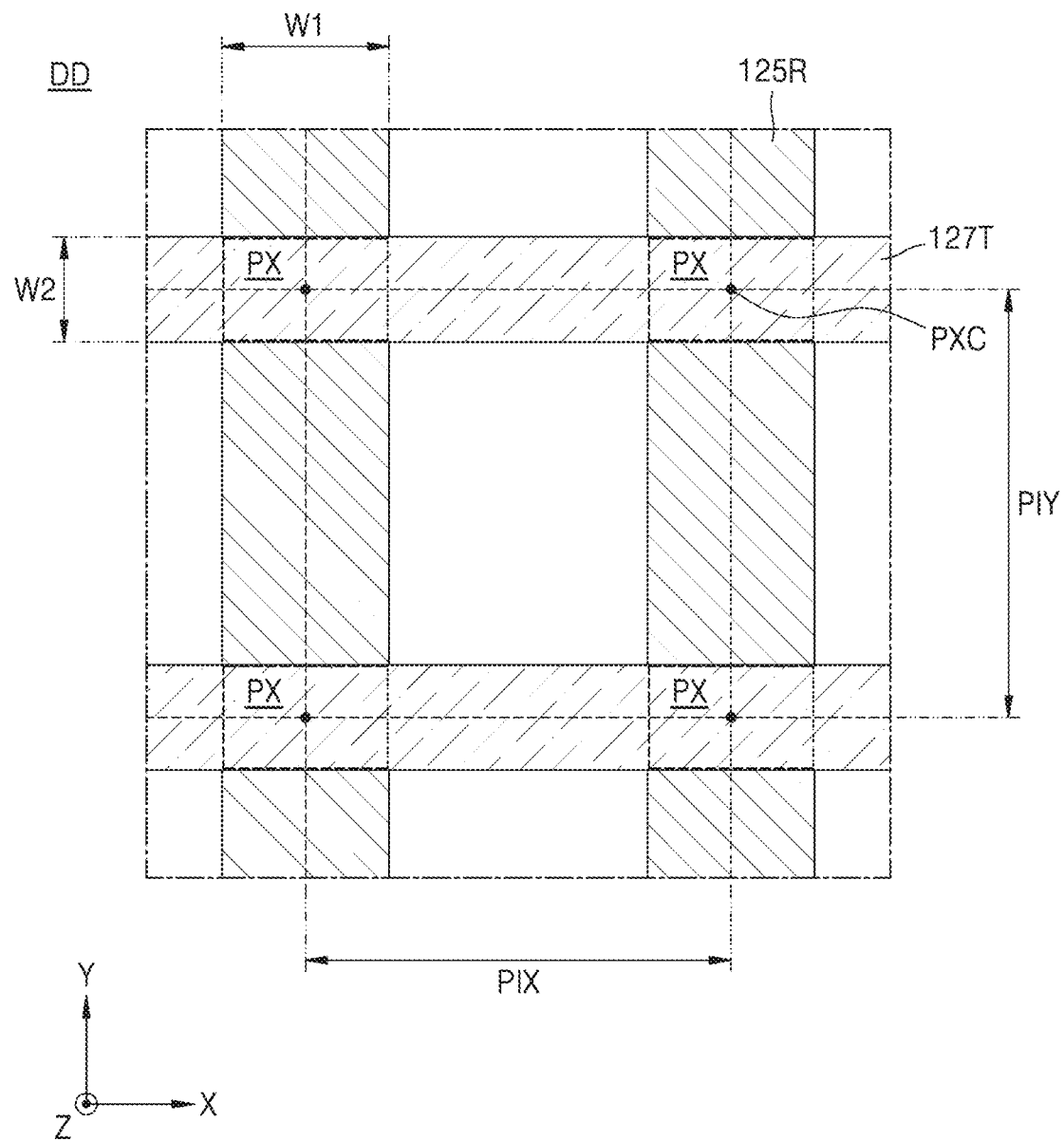

In detail, FIG. 2A is a schematic plan view of a layout of the fingerprint sensor package 10, FIG. 2B is a cross-sectional view taken along line B-B' of FIG. 2A, FIG. 2C is a cross-sectional view taken along line C-C' of FIG. 2A, and FIG. 2D is an enlarged partial plan view of a region DD of FIG. 2A.

Referring to FIGS. 2A through 2D at the same time, the fingerprint sensor package 10 may include a package substrate 100, a controller chip 210, a passive element 220, a molding member 230, a coating member 300, and various types of conductive layers.

The fingerprint sensor package 10 according to the present example embodiments may have a total thickness of about 0.76 mm or less. In some example embodiments, a total thickness of the fingerprint sensor package 10 may be about 0.5 mm or less. For example, a total thickness of the fingerprint sensor package 10 may be in a range of about 0.1 mm to about 0.4 mm. Accordingly, the fingerprint sensor package 10 may be easily applied to various products that are bendable or require a small thickness (e.g., the smartcard described above).

The package substrate 100 may include a base layer 111, a lower insulating layer 113, an upper insulating layer 115, a lower protection layer 117, and an upper protection layer 119, which include an insulating material. Also, the package substrate 100 may include first conductive patterns 121G, 121P, 121R, 121S, and 121T, second conductive patterns 123G, 123R, and 123T, third conductive patterns 125G, 125R, and 125T, and fourth conductive patterns 127G and 127T, which include a conductive material. Also, the package substrate 100 may include first conductive vias 131G, 131R, and 131T, second conductive vias 133G, 133R, and 133T, third conductive vias 135G, 135R, and 135T, and fourth conductive vias 137G and 137T, which include a conductive material.

The package substrate 100 may include a printed circuit board (PCB), for example, may include a flexible PCB (FPCB). In some example embodiments, the package substrate 100 may be a PCB including a multi-layered conductive layer. The first conductive patterns 121G, 121P, 121R, 121S, and 121T may constitute a conductive layer of a first layer, the second conductive patterns 123G, 123R, and 123T may constitute a conductive layer of a second layer, the third conductive patterns 125G, 125R, and 125T may constitute a conductive layer of a third layer, and the fourth conductive patterns 127G and 127T may constitute a conductive layer of a fourth layer. However, the structure and the number of layers of conductive layers are not limited thereto.

The package substrate 100 may approximately have a rectangular planar shape or a square planar shape. A direction parallel to one pair of edges of the package substrate 100 is defined as a first direction (X-direction), and a direction parallel to the other pair of edges of the package substrate 100 is defined as a second direction (Y-direction), and a direction perpendicular to an upper surface of the package substrate 100 is defined as a third direction (Z-direction).

A first length LX of the package substrate 100 in the first direction (X-direction) may be in a range of about 10 mm to about 15 mm. A second length LY of the package substrate 100 in the second direction (Y-direction) may be in a range of about 10 mm to about 15 mm. For example, the first length LX of the package substrate 100 may be about 12.7 mm, and the second length LY thereof may be about 12.7 mm. However, the first length LX and the second length LY of the package substrate 100 are not limited to the above numerical values.

Also, each of corners CN of the package substrate 100 may be round. In some example embodiments, a radius of curvature of the corners CN may be in a range of about 1 mm to about 2 mm. For example, the radius of curvature of the corners CN may be about 1.6 mm. The corners CN of the package substrate 100 are round to efficiently reduce or prevent cracks that may be formed in the corners CN in a process of cutting a package panel (100P, see FIG. 11D) by using punching equipment (PM, see FIG. 11D). This will be described in more detail later.

A sensing region SR, a first contact region CR1, a second contact region CR2, a third contact region CR3, a wiring region YR, and a peripheral region ER may be defined on the package substrate 100. In detail, the sensing region SR may be a region where first and second sensing patterns 125R and 127T for fingerprint recognition are arranged. The first contact region CR1 and the third contact region CR3 may be regions in which the first through third conductive vias 131R, 133R, and 135R for connecting the first sensing patterns 125R to the controller chip 210 are arranged. The second contact region CR2 may be a region in which the first through fourth conductive vias 131T, 133T, 135T, and 137T for connecting the second sensing patterns 127T to the controller chip 210 are arranged. The wiring region YR may be a region in which at least some of the first through fourth conductive vias 131G, 133G, 135G, and 137G for connecting a fourth ground pattern 127G to the controller chip 210 are arranged.

The sensing region SR may be in a center portion of the package substrate 100, but is not limited thereto. In some example embodiments, the sensing region SR may have a square shape. The plurality of first sensing patterns 125R that are apart from each other in the first direction (X-direction) and have a line shape extending in the second direction (Y-direction) and the plurality of second sensing patterns 127T that are apart from each other in the second direction (Y-direction) and have a line shape extending in the first direction (X-direction) may be arranged in the sensing region SR. Accordingly, as is illustrated in FIGS. 2A and 2D, according to at least some example embodiments of the inventive concepts, the direction in which the second sensing patterns 127T extend (i.e., the X-direction) may be a direction crossing the direction in which the first sensing patterns 125R extend (i.e., the Y-direction). In the present specification, directions crossing each other may refer to directions that are not parallel to each other (e.g., directions that are perpendicular to, or otherwise intersect with, each other). The first contact region CR1 may be formed at one end of the sensing region SR in the second direction (Y-direction), and the third contact region CR3 may be formed at the other end thereof. Also, the second contact region CR2 may be formed at one end of the sensing region SR in the first direction (X-direction), and the wiring region YR may be formed at the other end thereof.

The peripheral region ER may surround the sensing region SR, the first contact region CR1, the second contact region CR2, the third contact region CR3, and the wiring region YR horizontally (X-Y plane). Ground patterns 121G, 123G, 125G, and 127G for providing a reference potential and shielding sensing noise may be arranged in the peripheral region ER.

The first sensing patterns 125R may extend in the sensing region SR and the first and third contact regions CR1 and CR3. The first sensing patterns 125R may be connected to the controller chip 210 via the first through third conductive vias 131R, 133R, and 135R arranged in the first and third contact regions CR1 and CR3.

Some of the first sensing patterns 125R may be connected to the first through third conductive vias 131R, 133R, and 135R arranged in the first contact region CR1, and other ones may be connected to the first through third conductive vias 131R, 133R, and 135R arranged in the third contact region CR3. The first through third conductive vias 131R, 133R, and 135R in the first contact region CR1 and the first through third conductive vias 131R, 133R, and 135R in the third contact region CR3 may be each arranged in a line in the first direction (X-direction).

The first sensing patterns 125R that neighbor each other may be connected to different, first through third conductive vias 131R, 133R, and 135R arranged in the first and third contact regions CR1 and CR3. For example, the first sensing pattern 125R connected to the first through third conductive vias 131R, 133R, and 135R of the first contact region CR1 and another first sensing pattern 125R connected to the above first sensing pattern 125R may be connected to the first through third conductive vias 131R, 133R, and 135R of the third contact region CR3. That is, the first sensing patterns 125R neighboring each other may be electrically separated from each other.

The second sensing patterns 127T may extend in the sensing region SR and the second contact region CR2. The second sensing patterns 127T may be connected to the controller chip 210 via the first through fourth conductive vias 131T, 133T, 135T, and 137T arranged in the second contact region CR2. The first through fourth conductive vias 131T, 133T, 135T, and 137T corresponding to neighboring second sensing patterns 127T may be arranged in an alternating, zigzag pattern in the second direction (Y-direction).

The first sensing patterns 125R may have a first width W1, which is a width in the first direction (X-direction), and the second sensing patterns 127T may have a second width W2, which is a width in the second direction (Y-direction). In some example embodiments, the first width W1 may be greater than the second width W2. For example, the first width W1 may be in a range of about twice to about four times the second width W2. In detail, the first width W1 may be in a range of about 40 μm to about 70 μm, and the second width W2 may be in a range of about 5 μm to about 25 μm. However, the first width W1 and the second width W2 are not limited to the above numerical values.

Portions of the first sensing patterns 125R and the second sensing patterns 127T, in which the first sensing patterns 125R and the second sensing patterns 127T overlap each other in the third direction (Z-direction) constitute pixels PX. A first pitch PIX between centers PCX of the pixels PX in the first direction (X-direction) may be substantially equal to a second pitch PIY between the centers PXC of the pixels PX in the second direction (Y-direction), but is not limited thereto. For example, the first pitch PIX and the second pitch PIY may be each in a range of about 50 μm to about 90 μm.

The pixels PX may have a combined capacitance value of area capacitance AC according to the first sensing patterns 125R and the second sensing patterns 127T that overlap each other and fringing capacitance (not shown) according to the first sensing patterns 125R and the second sensing patterns 127T.

When a fingerprint of a user contacts the coating member 300, due to capacitance induced between the second sensing patterns 127T and the fingerprint of the user, capacitance values respectively corresponding to the pixels PX may change. The change in the capacitance values is determined according to a pattern of the user's fingerprint, and thus, the controller chip 210 may identify the user's fingerprint from the change in the capacitance values of the pixels PX. For example, the controller chip 210 may include processing circuitry such as hardware including logic circuits; a hardware/software combination executing software; or a combination thereof. For example, the processing circuitry more specifically may include, but is not limited to, one or more of a central processing unit (CPU), a processor core, an arithmetic logic unit (ALU), a digital signal processor, a microcomputer, a field programmable gate array (FPGA), a programmable logic unit, a microprocessor, an application-specific integrated circuit (ASIC), etc. the processing circuitry may be configured, via hardware and/or software, to perform and/or control any operation described in the specification as being performed by a controller chip (e.g., controller chip 210).

However, the change in the capacitance values may be changed not only by the pattern of the user's fingerprint but partially also according to a use environment of the user. That is, because sensing noise may occur according to the use environment of the user, the change in the capacitance values may include error with respect to the sensing noise. Thus, to reduce or minimize the sensing noise, the fourth ground pattern 127G may be arranged to horizontally surround the sensing region SR. The fourth ground pattern 127G is arranged above the package substrate 100, and thus may be referred to as an upper ground pattern.

The fourth ground pattern 127G may include a closed line pattern that is arranged horizontally along an outer circumference of the coating member 300 covering the sensing region SR and has a uniform width. As will be described later, the shape of the fourth ground pattern 127G is not limited thereto. From an edge of the coating member 300 to the fourth ground pattern 127G, there may be a first distance D1 in the first direction (X-direction) and a second distance D2 in the second direction (Y-direction). In some example embodiments, the first distance D1 and the second distance D2 may be substantially equal to each other. In detail, each of the first distance D1 and the second distance D2 may be equal to or greater than about 50 μm.

The base layer 111 may include an insulating material. The base layer 111 may include a resin and glass fiber. The resin included in the base layer 111 may include at least one of a phenol resin, an epoxy resin, and polyimide. In some example embodiments, the base layer 111 may include at least one material selected from Flame Retardant 4 (FR4), tetrafunctional epoxy, polyphenylene ether, eEpoxy/polyphenylene oxide, Thermount, bismaleimide triazine (BT), cyanate ester, polyimide, prepreg, Ajinomoto build-up film, (ABF), and liquid crystal polymer. In other example embodiments, the base layer 111 may include a silicon oxide, a silicon nitride, a silicon oxynitride, or a combination thereof. Glass fiber included in the base layer 111 may be a reinforcement material, and may be obtained by bundling glass filaments obtained by performing melt spinning on a glass material at a high temperature. The glass filament may be an ore processed product including silica as a main component.

For convenience of description and understanding, elements will be described in an order in which they are closer to the base layer 111.

The second conductive patterns 123G, 123R, and 123T may be arranged on a lower surface of the base layer 111, and the third conductive patterns 125G, 125R, and 125T may be arranged on an upper surface of the base layer 111. The second conductive patterns 123G, 123R, and 123T and the third conductive patterns 125G, 125R, and 125T may include at least one selected from copper (Cu), aluminum (Al), nickel (Ni), silver (Ag), gold (Au), platinum (Pt), tin (Sn), lead (Pb), titanium (Ti), chromium (Cr), palladium (Pd), indium (In), zinc (Zn), carbon (C), and an alloy thereof. The first conductive patterns 121G, 121P, 121R, 121S, and 121T and the fourth conductive patterns 127G and 127T to be described later may also include a material that is the same or substantially the same as the above material.

The second conductive patterns 123G, 123R, and 123T may include second ground patterns 123G to which a reference potential is applied and second sensing pads 123R and 123T. The second ground patterns 123G may be arranged in the sensing region SR, the wiring region YR, and the peripheral region ER. The second ground patterns 123G may be horizontally apart from the first through third contact regions CR1, CR2, and CR3. The second ground patterns 123G may overlap the first sensing patterns 125R and the second sensing patterns 127T in the third direction (Z-direction). The second ground patterns 123G may be between the second sensing patterns 127T and the controller chip 210. Accordingly, the second ground patterns 123G may protect the controller chip 210 from external sensing noise. The second sensing pads 123R may be arranged in the first and third contact regions CR1 and CR3, and the second sensing pads 123T may be arranged in the second contact region CR2. The second sensing pads 123R may provide a path for electrical connection between the first sensing patterns 125R and the controller chip 210, and the second sensing pads 123T may provide a path for electrical connection between the second sensing patterns 127T and the controller chip 210.

The lower insulating layer 113 may be arranged to surround the second conductive patterns 123G and 123R. The lower insulating layer 113 may cover the second conductive patterns 123G and 123R. The lower insulating layer 113 may electrically separate the second conductive patterns 123G and 123R from each other.

The third conductive patterns 125G, 125R, and 125T may include third ground patterns 125G, to which a reference potential is applied, the first sensing patterns 125R for recognizing a fingerprint of a user, and third sensing pads 125T. The first sensing patterns 125R may be arranged in the sensing region SR, and the third ground patterns 125G may be arranged in the wiring region YR and the peripheral region ER, and the third sensing pads 125T may be arranged in the second contact region CR2. The third sensing pads 125T may provide a path for electrical connection between the second sensing patterns 127T and the controller chip 210.

The upper insulating layer 115 may be arranged to surround the third conductive patterns 125G, 125R, and 125T. The upper insulating layer 115 may cover the third conductive patterns 125G, 125R, and 125T. The upper insulating layer 115 may electrically separate the third conductive patterns 125G, 125R, and 125T from each other.

The lower insulating layer 113 and the upper insulating layer 115 may include different materials from each other. For example, the upper insulating layer 115 may include a material having a permittivity suitable for fingerprint recognition of the fingerprint sensor package 10. However, at least some example embodiments of the inventive concepts are not limited thereto, and the lower insulating layer 113 and the upper insulating layer 115 may also include the same material as each other.

Each of the lower insulating layer 113 and the upper insulating layer 115 may include at least one selected from a phenol resin, an epoxy resin, and polyimide. In some example embodiments, each of the lower insulating layer 113 and the upper insulating layer 115 may include at least one selected from prepreg, FR4, tetrafunctional epoxy, polyphenylene ether, epoxy/polyphenylene oxide, Thermount, BT, cyanate ester, polyimide, and liquid crystal polymer.

The fourth conductive patterns 127G and 127T may be arranged on an upper surface of the upper insulating layer 115. The fourth conductive patterns 127G and 127T may include the fourth ground pattern 127G for removing sensing noise and the second sensing patterns 127T for recognizing a fingerprint of a user. The second sensing patterns 127T may be arranged in the sensing region SR, and the fourth ground pattern 127G may be arranged in the peripheral region ER.

The second sensing patterns 127T may be apart from the first sensing patterns 125R in the third direction (Z-direction), with the upper insulating layer 115 therebetween. That is, the second sensing patterns 127T may be electrically insulated from the first sensing patterns 125R via the upper insulating layer 115. Accordingly, the first sensing patterns 125R may constitute a first electrode of a capacitor, and the upper insulating layer 115 may constitute a dielectric layer of the capacitor, and the second sensing patterns 127T may constitute a second electrode of the capacitor. That is, a capacitor constituting a fingerprint sensor may be included in the package substrate 100.

The upper protection layer 119 may be arranged to surround the second sensing patterns 127T. The upper protection layer 119 may cover the second sensing patterns 127T. However, the upper protection layer 119 may be formed to expose the fourth ground pattern 127G. That is, to effectively remove sensing noise by extending an area of contact between a user fingerprint and the fourth ground pattern 127G, the fourth ground pattern 127G may be completely exposed from the upper protection layer 119. However, at least some example embodiments of the inventive concepts are not limited to the above numerical values.

The first conductive patterns 121G, 121P, 121R, 121S, and 121T may be arranged on a lower surface of the lower insulating layer 113. The first conductive patterns 121G, 121P, 121R, 121S, and 121T may include first power patterns 121P for supplying external power, first ground patterns 121G, to which a reference potential is applied, first signal patterns 121S via which a fingerprint recognition result of the fingerprint sensor package 10 is output to the outside (for example, to the display unit 12 described above), and first sensing pads 121R and 121T. The first ground patterns 121G are arranged below the package substrate 100, and thus may be referred to as a lower ground pattern.

At least some of the first conductive patterns 121G, 121P, 121R, 121S, and 121T may be connected to the controller chip 210. The first power patterns 121P may provide a power potential to the controller chip 210, and the first ground patterns 121G may provide a reference potential to the controller chip 210, and the first sensing pads 121R and 121T may transmit a signal recognized by the first and second sensing patterns 125R and 127T, to the controller chip 210.

Although not illustrated, a connection terminal (e.g., a solder ball) for electrically connecting the controller chip 210 to the first conductive patterns 121G, 121P, 121R, 121S, and 121T may be provided between the controller chip 210 and the first conductive patterns 121G, 121P, 121R, 121S, and 121T. As the first conductive patterns 121G, 121P, 121R, 121S, and 121T are contacted by a connection terminal, the first conductive patterns 121G, 121P, 121R, 121S, and 121T may be referred to as a plurality of connection pads.

The first sensing pads 121R may extend from the first and third contact regions CR1 and CR3 to a portion overlapping the controller chip 210 in the third direction (Z-direction), and the first sensing pads 121T may extend from the second contact region CR2 to a portion overlapping the controller chip 210 in the third direction (Z-direction). The first sensing pads 121R may provide a path for electrical connection between the first sensing patterns 125R and the controller chip 210, and the first sensing pads 121T may provide a path for electrical connection between the second sensing patterns 127T and the controller chip 210.

The lower protection layer 117 may be arranged to surround the first conductive patterns 121G, 121P, 121R, 121S, and 121T. The lower protection layer 117 may cover the first conductive patterns 121G, 121P, 121R, 121S, and 121T. The lower protection layer 117 may expose at least some of the first power patterns 121P, the first ground patterns 121G, and the first signal patterns 121S. In some example embodiments, the first power patterns 121P may contact an external terminal providing a power potential via an exposed surface thereof, and the first ground patterns 121G may contact an external terminal providing a reference potential via an exposed surface thereof. In other example embodiments, the external terminal may be replaced by an anisotropic conductive film (ACF) attached to the first conductive patterns 121G, 121P, 121R, 121S, and 121T.

Each of the lower protection layer 117 and the upper protection layer 119 may be an insulating coating layer. In some example embodiments, the lower protection layer 117 and the upper protection layer 119 may be solder resists. In other example embodiments, the lower protection layer 117 and the upper protection layer 119 may include a polymer material having excellent heat resistance, insulating characteristics, and mechanical intensity. For example, each of the lower protection layer 117 and the upper protection layer 119 may include polyimide, polyamide, polyacetal, polycarbonate, or the like.

Conductive vias that electrically connect the conductive layers of the multi-layer structure in the package substrate 100 will now be described.

The first conductive vias 131G, 131R, and 131T may be between the first conductive patterns 121G, 121R, and 121T and the second conductive patterns 123G, 123R, and 123T to provide an electrical connection. The first conductive vias 131G, 131R, and 131T may have a tapered structure in which a horizontal width thereof decreases toward the base layer 111.

In detail, the first conductive via 131G may provide an electrical connection between the first ground patterns 121G and the second ground patterns 123G, the first conductive via 131R may provide an electrical connection between the first sensing pads 121R and the second sensing pads 123R, and the first conductive via 131T may provide an electrical connection between the first sensing pads 121T and 121T and the second sensing pads 123T. For example, the first conductive via 131R may be arranged in the first and third contact regions CR1 and CR3, and the first conductive via 131T may be arranged in the second contact region CR2, and the first conductive via 131G may be arranged in the wiring region YR.

The second conductive vias 133G, 133R, and 133T and the third conductive vias 135G, 135R, and 135T may be between the second conductive patterns 123G, 123R, and 123T and the third conductive patterns 125G, 125R, and 125T to provide an electrical connection. Each of the second conductive vias 133G, 133R, and 133T and the third conductive vias 135G, 135R, and 135T may have a tapered structure toward a center of the base layer 111. In some example embodiments, the second conductive vias 133G, 133R, and 133T and the third conductive vias 135G, 135R, and 135T may have a smallest horizontal width in a surface of contact therebetween.

The second conductive vias 133G, 133R, and 133T may contact the second conductive patterns 123G, 123R, and 123T, and the third conductive vias 135G, 135R, and 135T may contact the third conductive patterns 125G, 125R, and 125T, and the second conductive vias 133G, 133R, and 133T and the third conductive vias 135G, 135R, and 135T may contact each other.

In detail, the second conductive via 133G may contact the second ground patterns 123G and the third conductive vias 135G, and the third conductive via 135G may contact the third ground patterns 125G. The second conductive via 133R may contact the second sensing pads 123R and the third conductive vias 135R, and the third conductive via 135R may contact the first sensing patterns 125R. The second conductive via 133T may contact the second sensing pads 123T and the third conductive vias 135T, and the third conductive via 135T may contact the third sensing pads 125T.

The fourth conductive vias 137G and 137T may be between the third conductive patterns 125G, 125R, and 125T and the fourth conductive patterns 127G and 127T to provide an electrical connection. The fourth conductive vias 137G and 137T may have a tapered structure toward the base layer 111.

In detail, the fourth conductive via 137G may provide an electrical connection between the third ground patterns 125G and the fourth ground pattern 127G, and the fourth conductive via 137T may provide an electrical connection between the third sensing pads 125T and the second sensing patterns 127T. The fourth conductive via 137T may be arranged in the second contact region CR2, and the fourth conductive via 137G may not be arranged in the second contact region CR2.

The controller chip 210 and the passive element 220 may be arranged on the lower protection layer 117. In some example embodiments, the controller chip 210 may be completely or partially arranged in the sensing region SR. In other example embodiments, the entire controller chip 210 may be arranged outside the sensing region SR. Like a memory chip and/or a processor chip, the controller chip 210 may include a component configured to perform a calculation operation to recognize a fingerprint of a user from a change in capacitance values of the pixels PX. Also, the passive element 220 may include, for example, a multi-layer ceramic capacitor (MLCC), but is not limited thereto.

The molding member 230 may be provided on the lower protection layer 117, the controller chip 210, and the passive element 220. The molding member 230 may protect the controller chip 210 and the passive element 220 from external influence such as contamination or impact. To perform this function, a thickness of the molding member 230 may be set such that the molding member 230 completely covers the controller chip 210 and the passive element 220. The molding member 230 may include an epoxy molding compound. Alternatively, the molding member 230 may include an epoxy-based material, a thermosetting material, a thermoplastic material, an ultraviolet (UV)-processed material, or the like.

The coating member 300 may be provided on the upper protection layer 119. The coating member 300 may cover and protect the sensing region SR of the package substrate 100. The coating member 300 may perform a function of protecting the sensing region SR from external influence such as contamination, impact, scratches, or the like. Accordingly, the coating member 300 may include high-intensity glass and/or plastic, but is not limited thereto. In some example embodiments, the coating member 300 may include a material having a permittivity suitable for fingerprint recognition (e.g., a high-k dielectric material).

The coating member 300 may protrude from the package substrate 100 in the third direction (Z-direction), and may have a thickness H1 equal to or less than about 50 μm, considering sensing sensitivity. In some example embodiments, the thickness H1 of the coating member 300 may be in a range of about 5 μm to about 50 μm. Also, as described above, there may be a distance of about 50 μm or greater from the edge of the coating member 300 to the fourth ground pattern 127G.

Ultimately, as the fingerprint sensor package 10 according to at least some example embodiments of the inventive concepts includes the fourth ground pattern 127G horizontally surrounding the sensing region SR to reduce or minimize sensing noise, fingerprint recognition performance with higher reliability may be provided.

Also, the fingerprint sensor package 10 according to at least some example embodiments of the inventive concepts includes, just in the package substrate 100, the sensing region SR corresponding to a fingerprint recognition sensor, and thus, the total thickness of the fingerprint sensor package 10 may be reduced, and the fingerprint sensor package 10 may be used in manufacturing smartcards having a similar thickness to that of credit cards or debit cards of the related art.

FIGS. 3 through 7 are plan views illustrating a fingerprint sensor package according to other example embodiments.

Most components of fingerprint sensor packages 20, 30, 40, 50, and 60 described below and materials of the components are substantially identical or similar to those described above with reference to FIGS. 2A through 2D. Thus, for convenience of description, description will focus on the difference based on the plane view of the fingerprint sensor package 10 described above.

Figure 3:
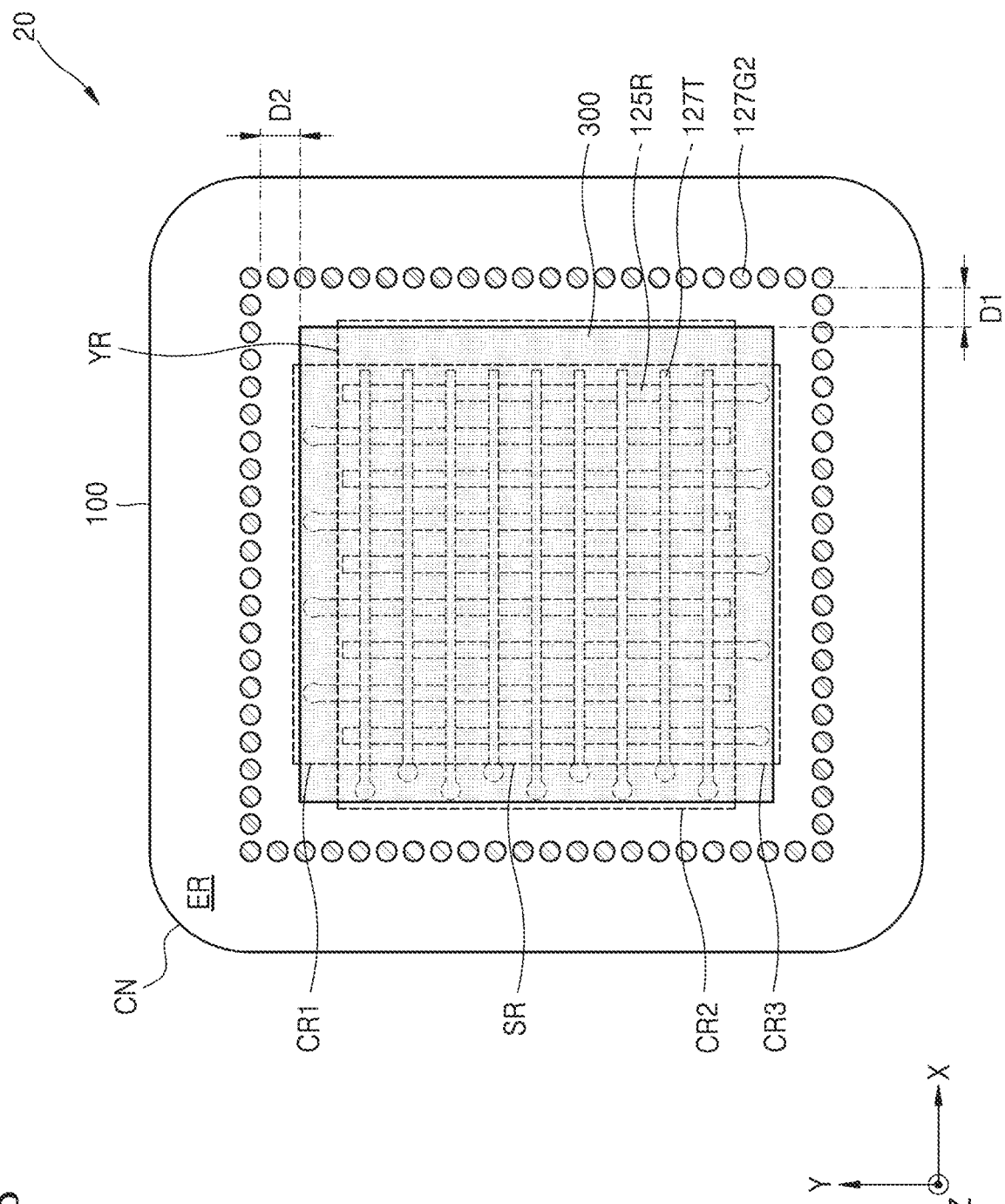
FIGS. 3 through 7 are plan views illustrating a fingerprint sensor package according to at least some example embodiments of the inventive concepts.

Referring to FIG. 3, the fingerprint sensor package 20 may include a coating member 300 covering a sensing region SR and a fourth ground pattern 127G2 surrounding the coating member 300, on a package substrate 100.

In the fingerprint sensor package 20 according to the present example embodiments, the fourth ground pattern 127G2 may include a plurality of circular patterns that are arranged along a planar shape of the coating member 300 covering the sensing region SR and are apart from each other by a uniform distance. Diameters of circles constituting the plurality of circular patterns may be equal to each other. In some example embodiments, circles respectively constituting the plurality of circular patterns may be ovals.

From an edge of the coating member 300 to the fourth ground pattern 127G2, there may be a first distance D1 in the first direction (X-direction) and a second distance D2 in the second direction (Y-direction). In some example embodiments, the first distance D1 and the second distance D2 may be substantially equal to each other. In detail, each of the first distance D1 and the second distance D2 may be equal to or greater than about 50 μm.

Figure 4:
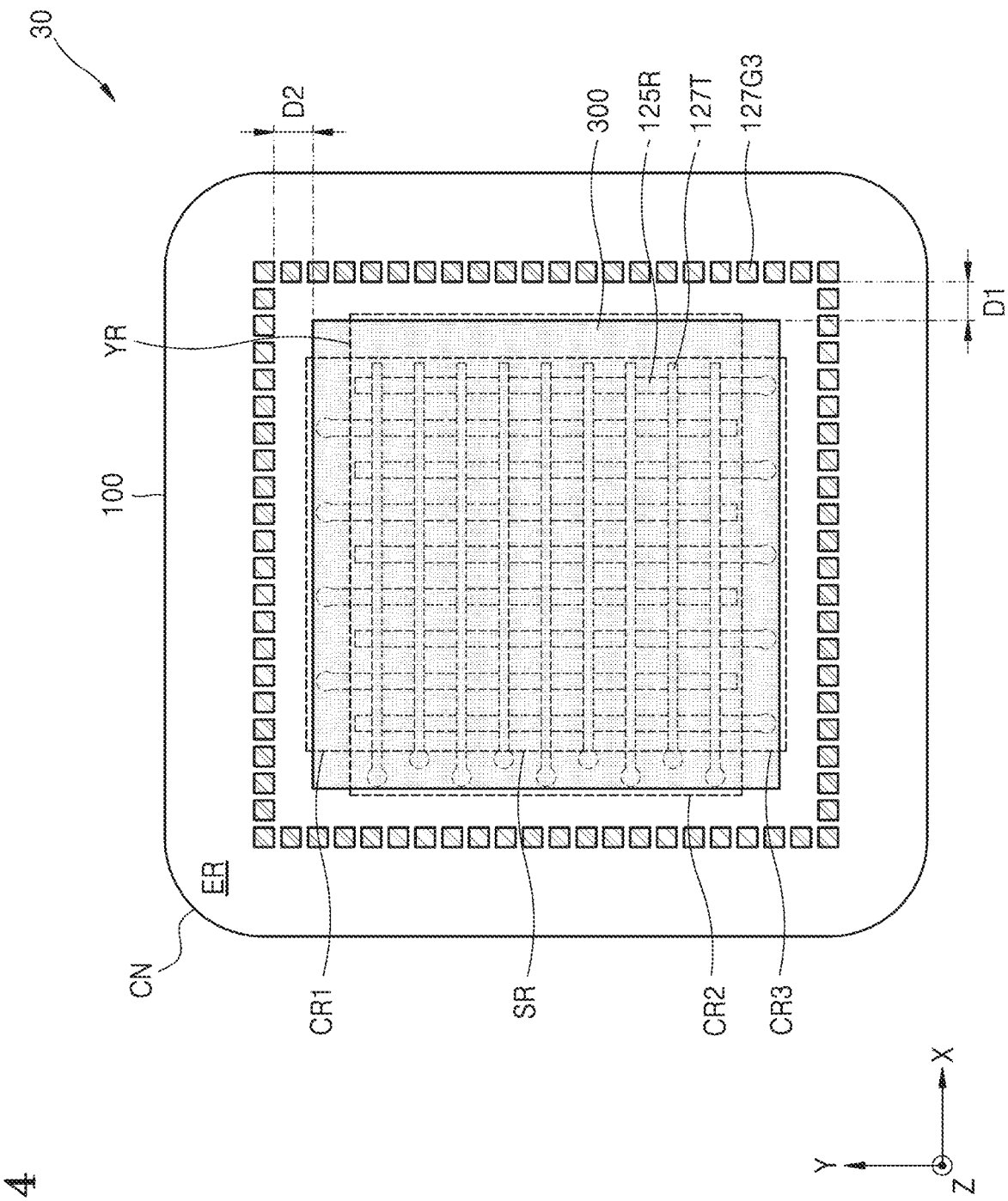

Referring to FIG. 4, the fingerprint sensor package 30 may include a coating member 300 covering a sensing region SR and a fourth ground pattern 127G3 surrounding the coating member 300, on a package substrate 100.

In the fingerprint sensor package 30 according to the present example embodiments, the fourth ground pattern 127G3 may include a plurality of quadrangular patterns that are arranged along a planar shape of the coating member 300 covering the sensing region SR and are apart from each other by a uniform distance. In some example embodiments, respective quadrangles constituting the plurality of quadrangular patterns may be a rectangle, a square or a rhombus.

From an edge of the coating member 300 to the fourth ground pattern 127G3, there may be a first distance D1 in the first direction (X-direction) and a second distance D2 in the second direction (Y-direction). In some example embodiments, the first distance D1 and the second distance D2 may be substantially equal to each other. In detail, each of the first distance D1 and the second distance D2 may be equal to or greater than about 50 μm.

Figure 5:
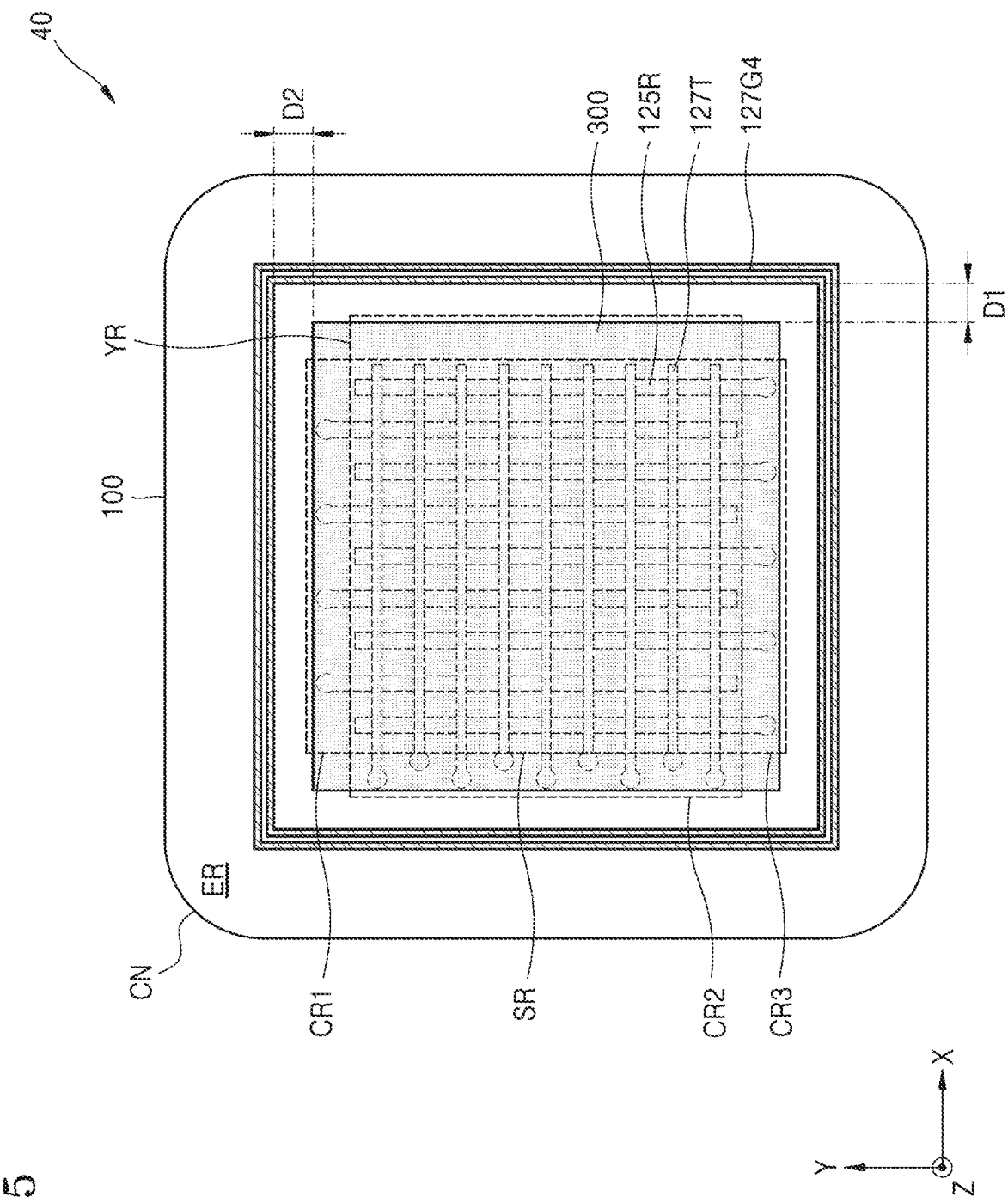

Referring to FIG. 5, the fingerprint sensor package 40 may include a coating member 300 covering a sensing region SR and a fourth ground pattern 127G4 surrounding the coating member 300, on a package substrate 100.

In the fingerprint sensor package 40 according to the present example embodiments, the fourth ground pattern 127G4 may include a plurality of closed line patterns that are arranged along a planar shape of the coating member 300 covering the sensing region SR and are apart from each other by a uniform distance and have a uniform width. In some example embodiments, the number of closed line patterns constituting the plurality of closed line patterns is not limited to two as illustrated, and may be three or more.

From an edge of the coating member 300 to the fourth ground pattern 127G4, there may be a first distance D1 in the first direction (X-direction) and a second distance D2 in the second direction (Y-direction). In some example embodiments, the first distance D1 and the second distance D2 may be substantially equal to each other. In detail, each of the first distance D1 and the second distance D2 may be equal to or greater than about 50 μm.

Figure 6:
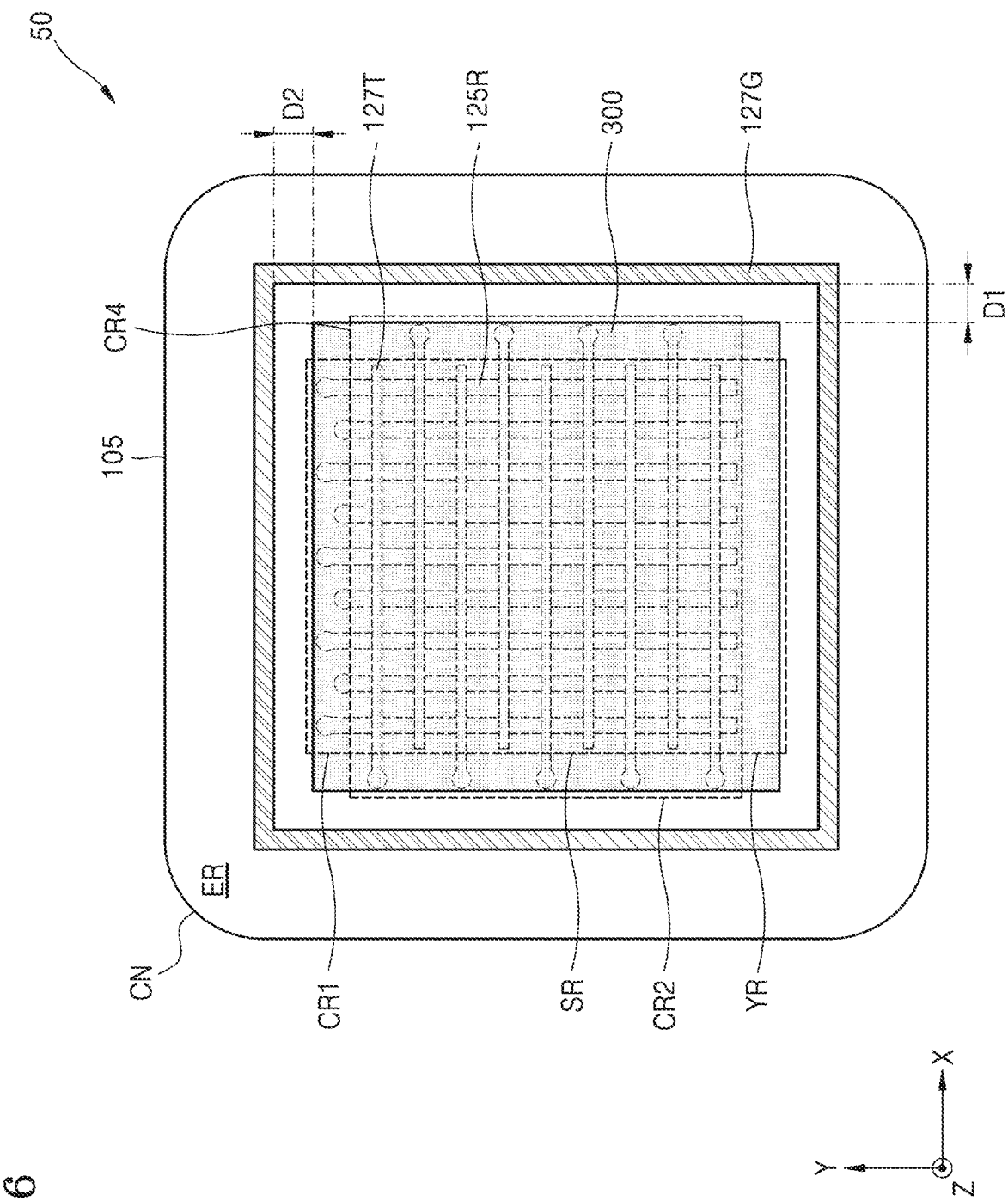

Referring to FIG. 6, in the fingerprint sensor package 50, a sensing region SR, a first contact region CR1, a second contact region CR2, a fourth contact region CR4, a wiring region YR, and a peripheral region ER may be defined on a package substrate 105.

In the fingerprint sensor package 50 according to the present example embodiments, the first contact region CR1 may be formed at one end of the sensing region SR in the second direction (Y-direction), and the wiring region YR may be formed at the other end thereof. The second contact region CR2 may be formed at one end of the sensing region SR in the first direction (X-direction), and the fourth contact region CR4 may be formed at the other end thereof.

The first through third conductive vias 131R, 133R, and 135R (see FIG. 2B) of the first contact region CR1 may be arranged in an alternating, zigzag pattern in the first direction (X-direction). The first through fourth conductive vias 131T, 133T, 135T, and 137T (see FIG. 2C) of the second contact region CR2 and the fourth contact region CR4 may be respectively arranged in the second direction (Y-direction) in a line.

Figure 7:
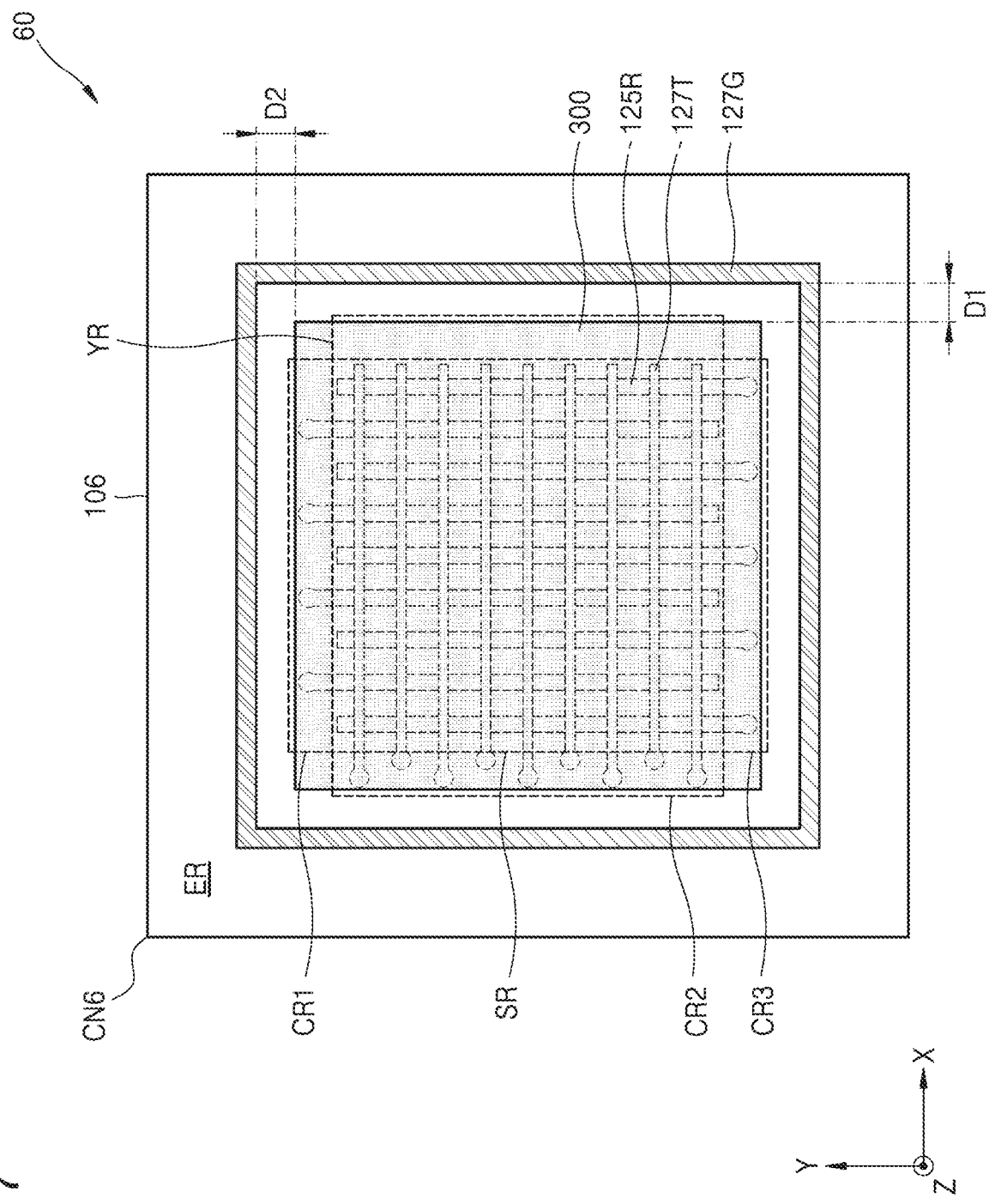

Referring to FIG. 7, the fingerprint sensor package 60 may include a coating member 300 covering a sensing region SR and a fourth ground pattern 127G surrounding the coating member 300, on a package substrate 106.

In the fingerprint sensor package 60 according to the present example embodiments, each of corners CN6 of the package substrate 106 may be angular. For example, the corners CN6 may be at a right angle as an edge thereof in the first direction (X-direction) meets an edge thereof in the second direction (Y-direction). A shape of the corners CN6 of the package substrate 106 may be reflected in a processing of cutting the package substrate 106 by using the punching equipment PM (see FIG. 11D).

Figure 8:
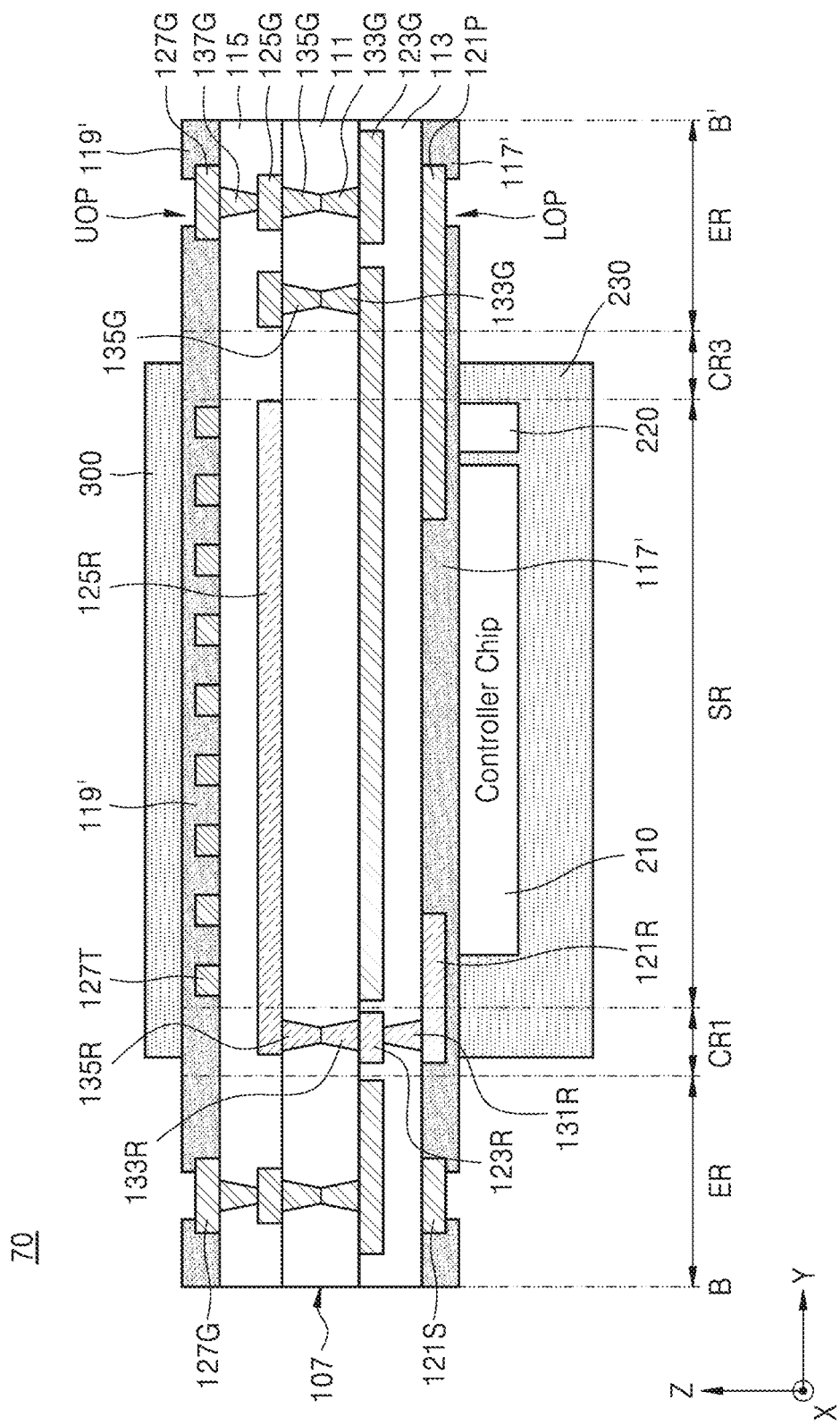
FIGS. 8 through 10 are cross-sectional views illustrating a fingerprint sensor package according to at least some example embodiments of the inventive concepts.
Figure 9:
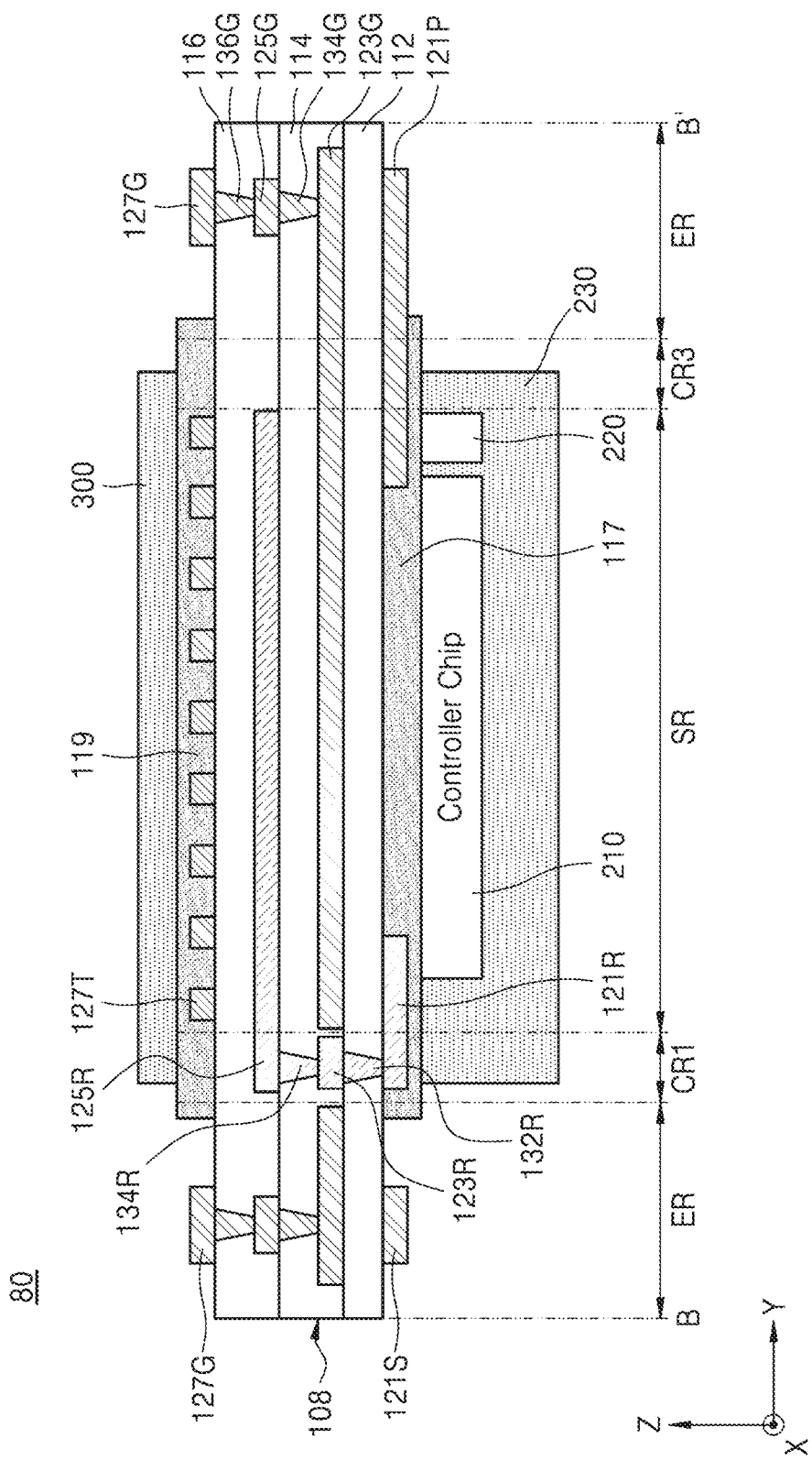
Figure 10:
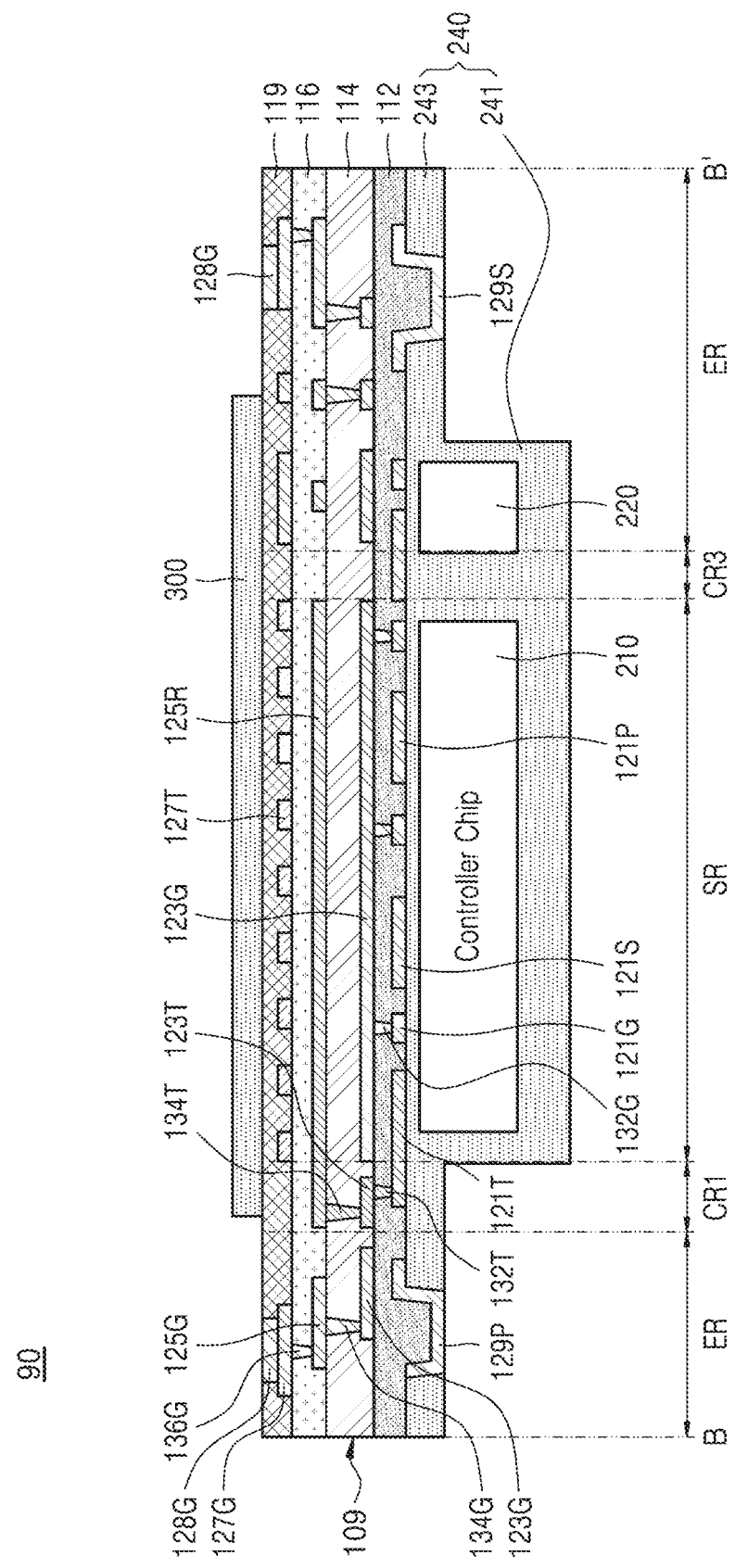

FIGS. 8 through 10 are cross-sectional views illustrating a fingerprint sensor package according to other example embodiments.

Most components of fingerprint sensor packages 70, 80, and 90 described below and materials of the components are substantially identical or similar to those described above with reference to FIGS. 2A through 2D. Thus, for convenience of description, description will focus on the difference based on the cross-sectional view of the fingerprint sensor package 10.

Referring to FIG. 8, the fingerprint sensor package 70 may include a package substrate 107, a controller chip 210, a passive element 220, a molding member 230, and a coating member 300.

In the fingerprint sensor package 70 according to the present example embodiments, an upper protection layer 119' may be arranged on the fourth conductive patterns 127G and 127T. The upper protection layer 119' may cover the fourth conductive patterns 127G and 127T. The upper protection layer 119' may include upper openings UOP exposing a portion of the fourth ground pattern 127G.

A lower protection layer 117' may be arranged on the first conductive patterns 121G, 121P, 121R, 121S, and 121T. The lower protection layer 117' may cover the first conductive patterns 121G, 121P, 121R, 121S, and 121T. The lower protection layer 117' may include lower openings LOP exposing some of the first power patterns 121P, the first ground patterns 121G, and the first signal patterns 121S.

Referring to FIG. 9, the fingerprint sensor package 80 may include a package substrate 108, a controller chip 210, a passive element 220, a molding member 230, and a coating member 300.

In the fingerprint sensor package 80 according to the present example embodiments, the package substrate 108 may not include a base layer. The package substrate 108 may include first through third insulating layers 112, 114, and 116, which include an insulating material. The package substrate 108 may include first conductive vias 132G, 132R, and 132T, second conductive vias 134G, 134R, and 134T, and third conductive vias 136G, 136R, and 136T that have a tapered structure toward the controller chip 210.

The first insulating layer 112 may be arranged on the lower protection layer 117. The first conductive vias 132G, 132R, and 132T may pass through the first insulating layer 112 to contact the first conductive patterns 121G, 121R, and 121T.

The second insulating layer 114 may be arranged on the first insulating layer 112. The second conductive patterns 123G, 123R, and 123T may be covered by the second insulating layer 114. The second conductive vias 134G, 134R, and 134T may pass through at least a portion of the second insulating layer 114 to contact the second conductive patterns 123G, 123R, and 123T.

The third insulating layer 116 may be arranged on the second insulating layer 114. The third conductive patterns 125G, 125R, and 125T may be covered by the third insulating layer 116. The third conductive vias 136G and 136T may pass through at least a portion of the third insulating layer 116 to contact the third conductive patterns 125G and 125T.

Referring to FIG. 10, the fingerprint sensor package 90 may include a package substrate 109, a controller chip 210, a passive element 220, a molding member 240, and a coating member 300.

The fingerprint sensor package 90 according to the present example embodiments may have a fan-out wafer level package (FO-WLP) structure. Also, in the fingerprint sensor package 90 according to the present example embodiments, the package substrate 109 may not include a base layer.

The package substrate 109 may include first through third insulating layers 112, 114, and 116 and a wiring structure. The wiring structure may include first conductive patterns 121G, 121P, 121S, and 121T, second conductive patterns 123G and 123T, third conductive patterns 125G, 125R, and 125T, fourth conductive patterns 127G and 127T, fifth conductive patterns 128G, and sixth conductive patterns 129P and 129S. The wiring structure may include first conductive vias 132G and 132T, second conductive vias 134G and 134T, and third conductive vias 136G and 136T that have a tapered structure toward the controller chip 210. In some example embodiments, the wiring structure may be formed using a dual damascene process.

The package substrate 109 may include the fifth conductive patterns 128G formed thereabove and sixth conductive patterns 129P and 129S formed therebelow. The fifth conductive patterns 128G may be arranged to horizontally surround the sensing region SR. The fifth conductive patterns 128G may be a ground pattern arranged above the package substrate 109, and may be referred to as an upper ground pattern.

The sixth conductive patterns 129P and 129S may include a sixth power pattern 129P via which external power is received and a sixth signal pattern 129S via which a signal is transmitted to the outside. Also, the sixth conductive patterns 129P and 129S may include an additional pattern to receive a reference potential from the outside.

The molding member 240 may have a step formed by partially removing a flat mold layer. The molding member 240 may include a first molding portion 241 protecting the controller chip 210 and the passive element 220 and a second molding portion 243 surrounding the first molding portion 241. A portion of each of the sixth conductive patterns 129P and 129S may be exposed via the second molding portion 243. That is, the package substrate 109 may include no lower protection layer.

FIGS. 11A through 11F illustrate a method of manufacturing a smartcard according to example embodiments, in a process order.

Figure 11A:
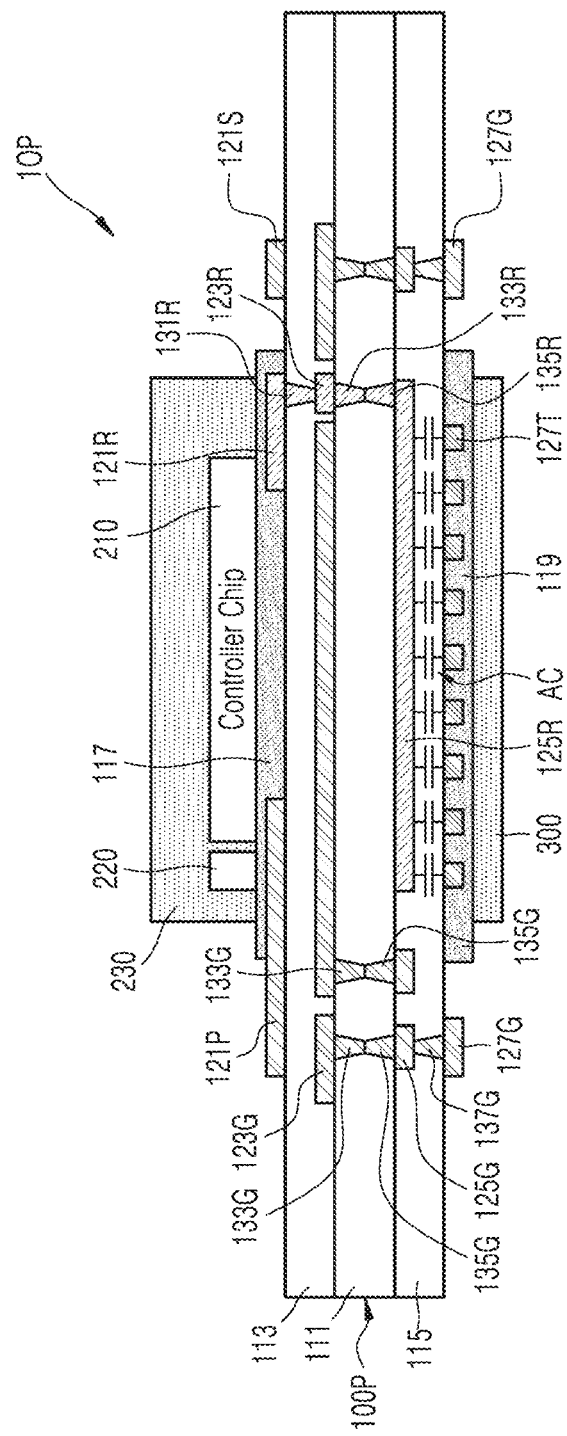

Referring to FIG. 11A, a fingerprint sensor module 10P including a package panel 100P, a controller chip 210, a passive element 220, a molding member 230, and a coating member 300 is prepared.

Most components of the fingerprint sensor module 10P and materials of the components are substantially identical or similar to those of the fingerprint sensor package 10 described above with reference to FIGS. 2A through 2D. The fingerprint sensor module 10P, however, includes the package panel 100P instead of the package substrate 100 (see FIG. 2B). The package panel 100P may have a greater horizontal width in the first direction (X-direction) and the second direction (Y-direction) than the package substrate 100 (see FIG. 2B).

Figure 11B:
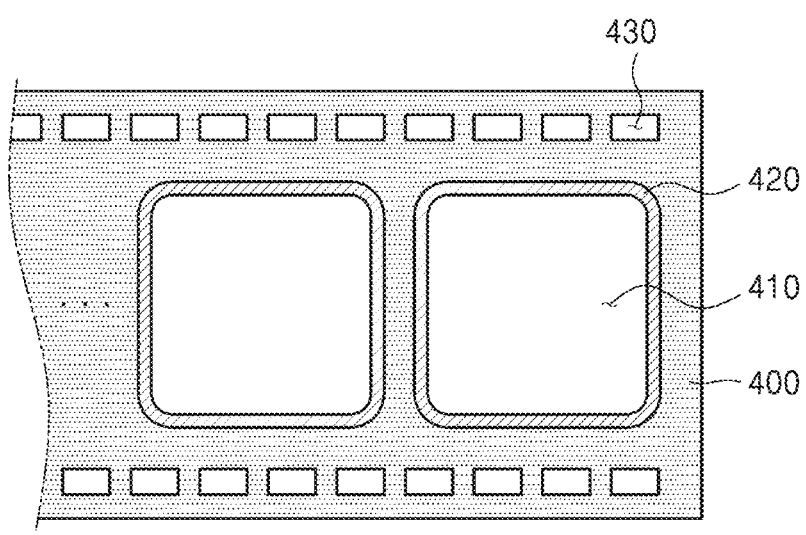

Referring to FIG. 11B, a base film 400 on which the fingerprint sensor module 10P (see FIG. 11A) is to be mounted is prepared.

The base film 400 may include an open area 410 in a center portion thereof, an adhesive area 420 surrounding the open area 410, and a plurality of perforation (PF) holes 430 arranged in two side ends of the open area 410. A pitch of the plurality of PF holes 430 is uniform, and thus, a length of the base film 400 may be defined by the number of PF holes 430. Meanwhile, a width and length of the base film 400 may be determined by the number of fingerprint sensor modules 10P and the size of the fingerprint sensor modules 10P (see FIG. 11A) mounted thereon. Reeling and releasing of the base film 400 may be controlled through the plurality of PF holes 430 by using winding reel equipment.

Figure 11C:
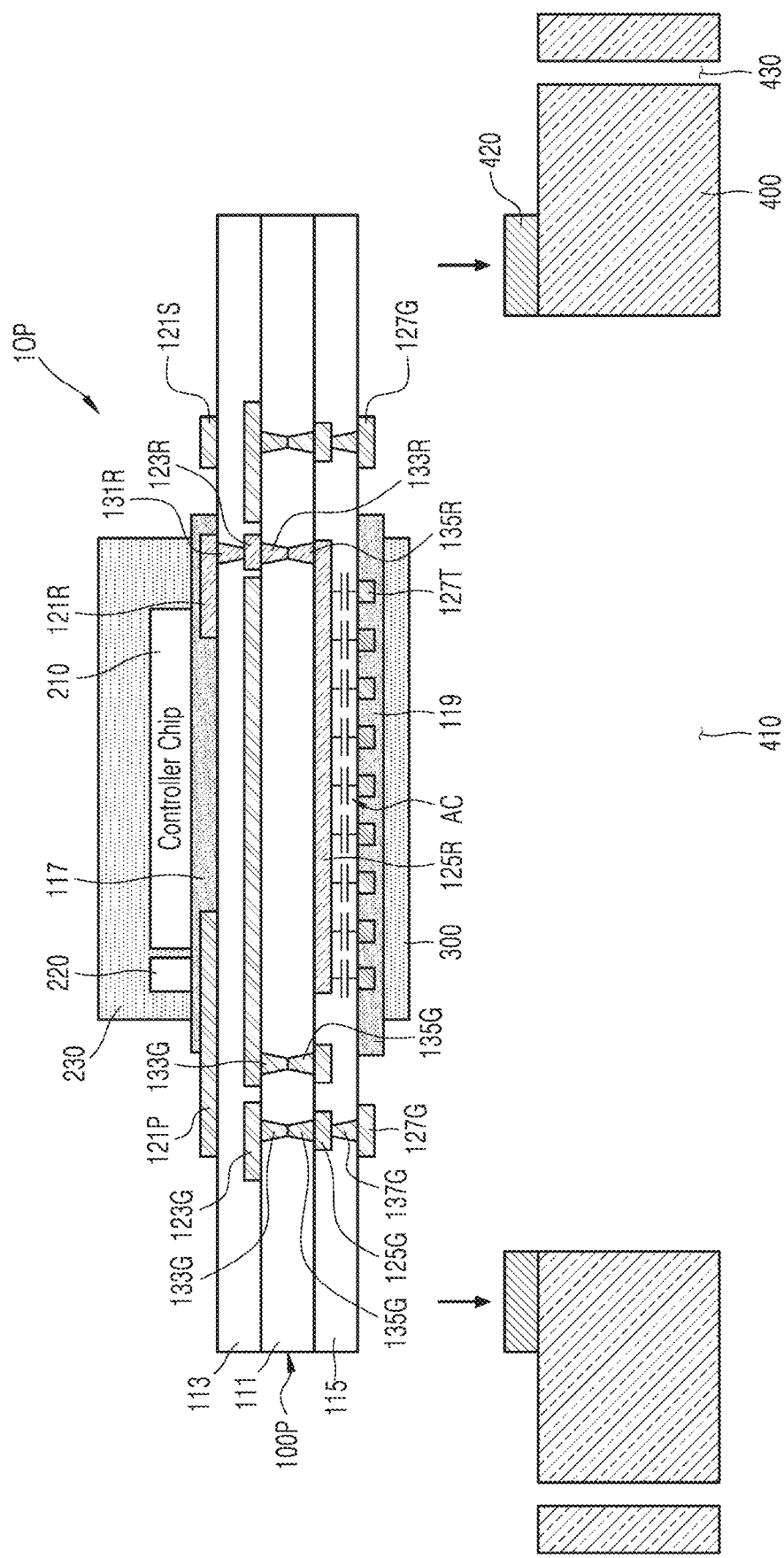

Referring to FIG. 11C, the fingerprint sensor module 10P is aligned and arranged on the base film 400.

A certain pressure may be applied to the fingerprint sensor module 10P such that the package panel 100P of the fingerprint sensor module 10P is attached to the adhesive area 420 of the base film 400. In some example embodiments, the fingerprint sensor module 10P is arranged on the base film 400 such that the coating member 300 faces the base film 400 and the controller chip 210 faces away from the base film 400.

Figure 11D:
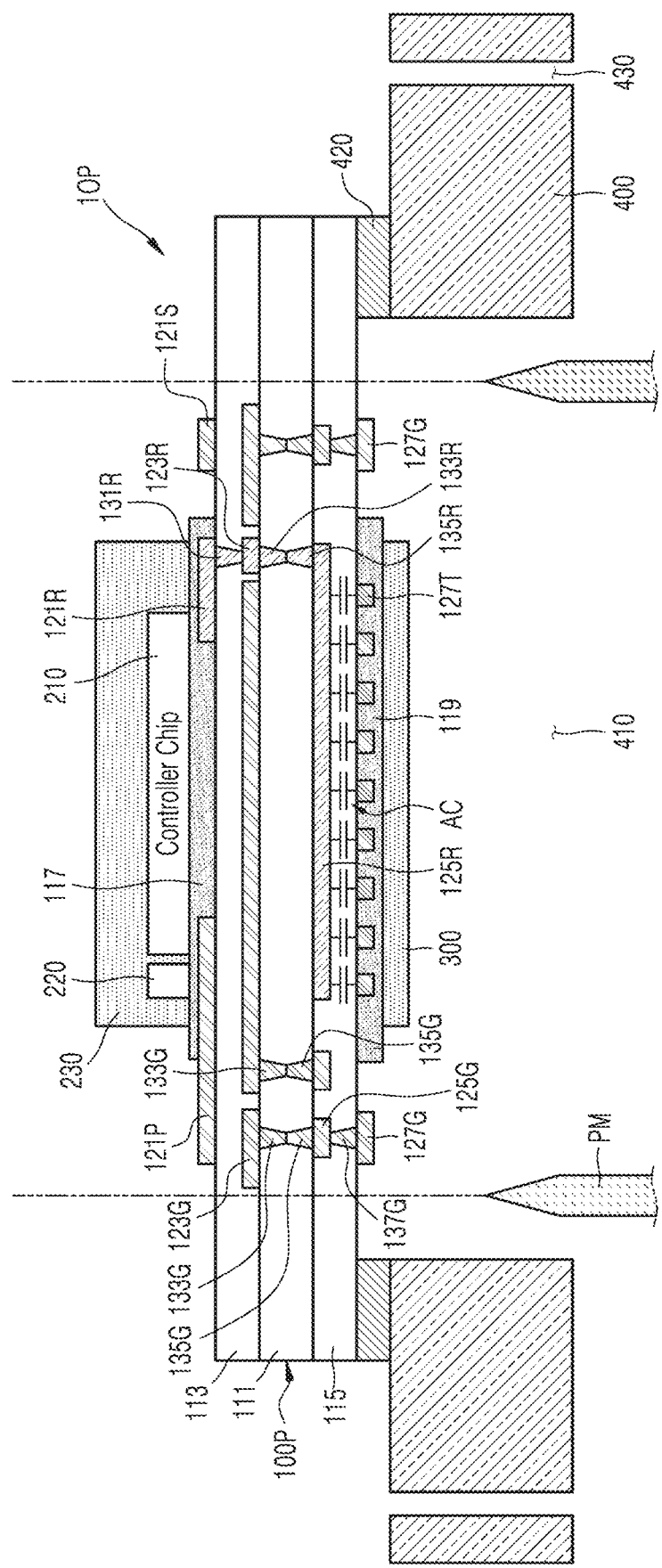

Referring to FIG. 11D, the fingerprint sensor module 10P is adhered to and mounted on the base film 400.

An upper insulating layer 115 of the package panel 100P may be adhered to the adhesive area 420 of the base film 400. A plurality of fingerprint sensor modules 10P may be mounted on one base film 400. In this manner, a plurality of fingerprint sensor modules 10P adhered to the base film 400 may be provided to an assembly line, thus allowing use of winding reel equipment of the related without any change thereto.

Next, by using the punching equipment PM, the package panel 100P is cut to separate the fingerprint sensor package 10 (see FIG. 11E) from the base film 400. To efficiently reduce or prevent cracks that may be generated in a process of cutting the package panel 100P by using the punching equipment PM, the process is performed such that corners of the package substrate 100 (see FIG. 11E) after cutting the same have a round shape.

Referring to FIG. 11E, a card main body 500 including a groove area 510, a card substrate 520, a connection area 530, and the security chip 11 is prepared.

The card substrate 520 and the security chip 11 storing financial information may be arranged in the card main body 500, and the groove area 510 for mounting the fingerprint sensor package 10 may be included in the card main body 500. The security chip 11 may be arranged in the card main body 500 such that a surface of the security chip 11 is exposed to the outside. As the card substrate 520, an FPCB may be used. Also, the connection area 530 for electrically connecting the fingerprint sensor package 10 to other components in the card main body 500 may be arranged in the card substrate 520. The fingerprint sensor package 10 is aligned with the groove area 510 of the card main body 500 in a direction in which the coating member 300 and the fourth ground pattern 127G are exposed to the outside.

Figure 11F:
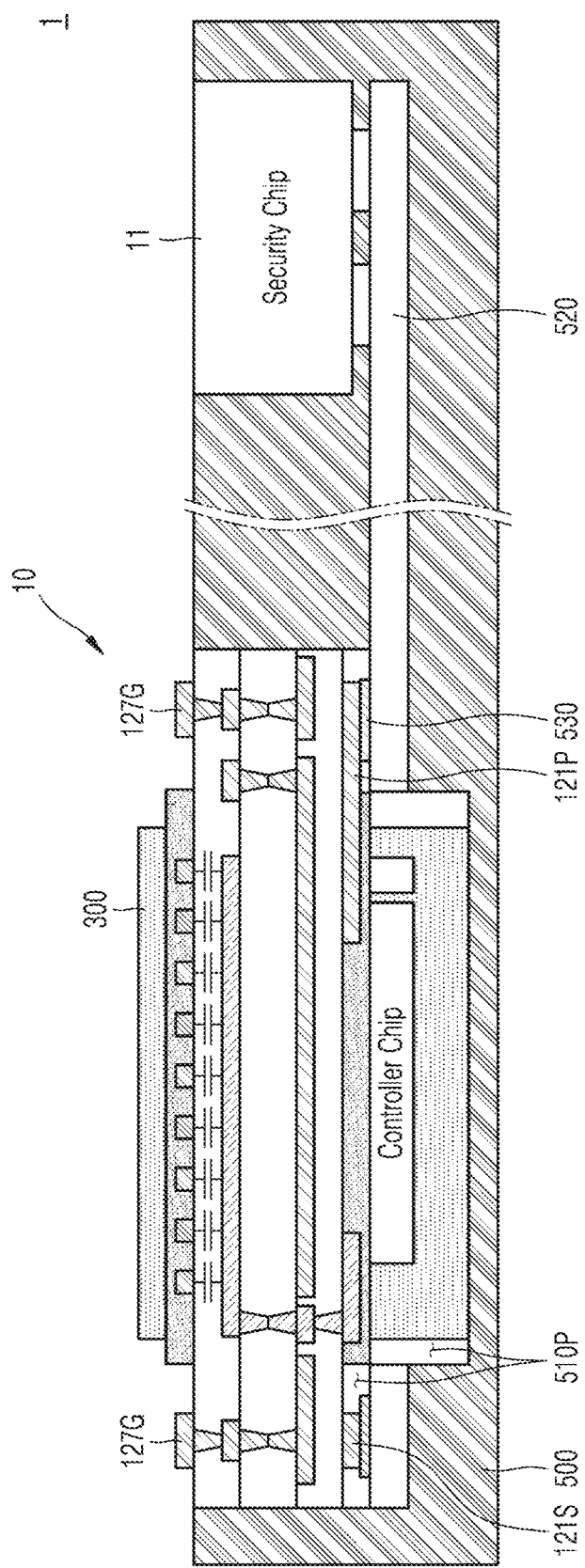

Referring to FIG. 11F, the fingerprint sensor package 10 is mounted in the groove area 510 of the card main body 500.

The first conductive patterns 121G, 121P, 121R, 121S, and 121T of the fingerprint sensor package 10 and the connection area 530 of the card substrate 520 may be brought into electrical contact with each other. In some example embodiments, a free space 510P that is empty between the fingerprint sensor package 10 and the card main body 500 may be formed. The free space 510P provides a space in which the fingerprint sensor package 10 may flexibly respond to a level of bending of the smartcard 1. In other example embodiments, the free space 510P may be filled with an adhesive by applying the adhesive thereto.

Referring to FIG. 1 also again, the smartcard 1 may include the fingerprint sensor package 10, the security chip 11, the display unit 12, and the power button 13. When a user has touched the fingerprint sensor package 10 of the smartcard 1 with his or her fingerprint, the touched fingerprint may be recognized. When the recognized fingerprint corresponds to a registered fingerprint, the security chip 11 may authorize a user of the smartcard 1 to pay.

Figure 12:
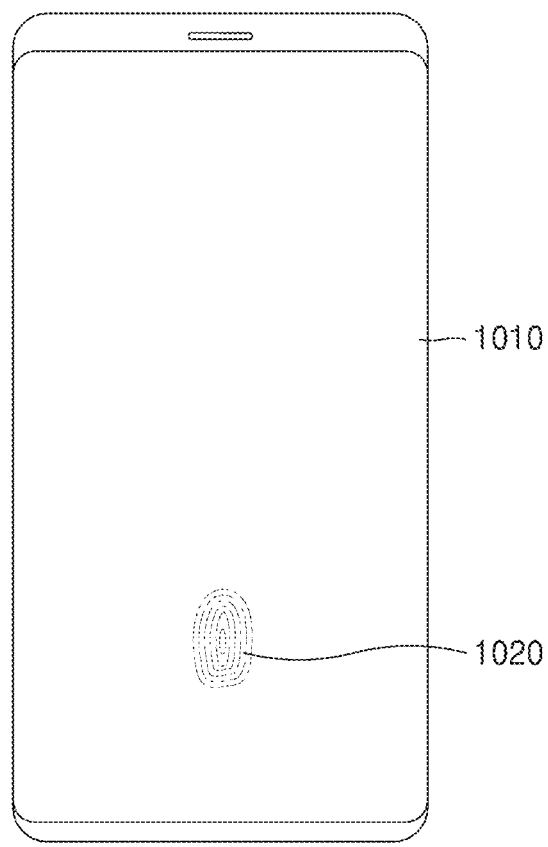
FIG. 12 is a plan view illustrating a mobile device including a fingerprint sensor package, according to at least some example embodiments of the inventive concepts.

FIG. 12 is a plan view illustrating a mobile device including a fingerprint sensor package, according to example embodiments.

Referring to FIG. 12, a mobile device 1000 may include a touch-screen-type display 1010 and a fingerprint sensor package 1020.

The mobile device 1000 may further include a camera, a speaker, a temperature sensor, a motion sensor, or the like. A smartphone is given as an example of the mobile device 1000, but is not limited thereto. For example, the mobile device 1000 may be a notebook computer, a tablet computer, or a wearable device such as a smartwatch, on which the fingerprint sensor package 1020 may be mounted. The fingerprint sensor package 1020 may be arranged on the display 1010 in the mobile device 1000. The fingerprint sensor package 1020 may be one of the fingerprint sensor packages 10, 20, 30, 40, 50, 60, 70, 80, and 90 described above with reference to FIGS. 2A through 10.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A fingerprint sensor package comprising:
   a package substrate including,
      an upper surface in which a sensing region and a peripheral region surrounding the sensing region are defined, and
      a lower surface facing the upper surface;
   a plurality of first sensing patterns located are arranged in the sensing region, are apart from each other in a first direction, and extend in a second direction crossing the first direction;
   a plurality of second sensing patterns that are arranged in the sensing region, are apart from each other in the second direction, and extend in the first direction;
   a coating member covering the sensing region;
   an upper ground pattern in the peripheral region and apart from the coating member to surround the coating member in the first and second directions;
   a controller chip on the lower surface of the package substrate; and
   a plurality of capacitors, wherein the plurality of first sensing patterns and the plurality of second sensing patterns are apart from each other in a third direction perpendicular to the first and second directions such that each capacitor from among the plurality of capacitors includes a sensing pattern from among the plurality of first sensing patterns as a first conductor and a sensing pattern from among the plurality of second sensing patterns as a second conductor.

2. The fingerprint sensor package of claim 1, further comprising:
a lower ground pattern; and
a plurality of connection pads on the lower surface of the package substrate,
wherein the lower ground pattern includes some connection pads from among the plurality of connection pads.

3. The fingerprint sensor package of claim 2,
wherein the upper ground pattern is configured to remove sensing noise generated by a user, and
wherein a reference potential is applied to the lower ground pattern.

4. The fingerprint sensor package of claim 1,
wherein the upper ground pattern is located along a planar shape of the coating member, and
wherein the upper ground pattern includes at least one of a closed line pattern having a uniform width, a plurality of circular patterns that are apart from each other, or a plurality of quadrangular patterns that are apart from each other.

5. The fingerprint sensor package of claim 1,
wherein the plurality of second sensing patterns are located farther from the controller chip in the third direction than the plurality of first sensing patterns, and
wherein a first width of each of the plurality of first sensing patterns is greater than a second width of each of the plurality of second sensing patterns.

6. The fingerprint sensor package of claim 5, further comprising:
an upper protection layer that covers the plurality of second sensing patterns,
wherein the upper protection layer exposes the upper ground pattern.

7. The fingerprint sensor package of claim 1, further comprising:
a passive element on the lower surface of the package substrate and adjacent to the controller chip; and
a molding member that covers the controller chip and the passive element.

8. The fingerprint sensor package of claim 1, further comprising:
a plurality of conductive vias that pass through the package substrate and electrically connect the plurality of first sensing patterns and the plurality of second sensing patterns to the controller chip,
wherein the plurality of conductive vias are tapered toward a center portion of the package substrate.

9. The fingerprint sensor package of claim 1,
wherein the coating member protrudes from the package substrate in the third direction, and
wherein a smallest distance from an edge of the coating member to the upper ground pattern is substantially equal in the first and second directions.

10. The fingerprint sensor package of claim 1, wherein each of corners of the package substrate has a round rectangular planar shape.

11. A fingerprint sensor package comprising:
a package substrate in which a sensing region and a peripheral region surrounding the sensing region are defined, wherein each of corners of the package substrate has a round rectangular planar shape; and
a controller chip mounted on the package substrate and configured to determine whether a recognized fingerprint corresponds to a registered fingerprint,
wherein the package substrate comprises:
a base layer;
a coating member, an upper protection layer between the coating member and an upper surface of the base layer, and an upper insulating layer between the upper protection layer and the upper surface of the base layer;
a molding member, a lower protection layer between the molding member and a lower surface of the base layer, and a lower insulating layer between the lower protection layer and the lower surface of the base layer;
first conductive patterns, at least some of which are covered by the lower protection layer, the first conductive patterns including first ground patterns, power patterns, signal patterns, and first sensing pads,
second conductive patterns covered by the lower insulating layer and including second ground patterns connected to the first ground patterns and second sensing pads connected to the first sensing pads;
third conductive patterns covered by the upper insulating layer and including third ground patterns connected to the second ground patterns, first sensing patterns that are connected to some of the second sensing pads and are apart from each other in a first direction and extend in a second direction crossing the first direction, and third sensing pads connected to other ones of the second sensing pads; and
fourth conductive patterns, at least some of which are covered by the upper protection layer, the fourth conductive patterns including fourth ground patterns connected to the third ground patterns and second sensing patterns that are connected to the third sensing pads and are apart from each other in the second direction and extend in the first direction,
wherein the first and second sensing patterns are in the sensing region,
wherein the controller chip is in the molding member, and
wherein the fourth ground patterns are in the peripheral region and are apart from the coating member to surround the coating member in the first and second directions.

12. The fingerprint sensor package of claim 11, further comprising:
first conductive vias connected to the first conductive patterns and the second conductive patterns and extending in a third direction perpendicular to the first and second directions;
second conductive vias connected to the second conductive patterns and extending in the third direction;
third conductive vias connected to the second conductive vias and the third conductive patterns and extending in the third direction; and
fourth conductive vias connected to the third conductive patterns and the fourth conductive patterns and extending in the third direction,
wherein the first through fourth conductive vias are tapered toward a center of the base layer in a thickness direction of the base layer.

13. The fingerprint sensor package of claim 11, wherein the fourth ground patterns are configured to remove sensing noise generated by a user and comprise a closed line pattern having a uniform width.

14. The fingerprint sensor package of claim 13,
wherein a thickness of the coating member is from about 5 μm to about 50 μm, and
wherein a smallest distance from an edge of the coating member to the fourth ground pattern is about 50 μm or greater.

15. The fingerprint sensor package of claim 11, wherein a radius of curvature of each corner is about 1.6 mm.

16. A smartcard comprising:
a card main body having a groove area;
a security chip storing financial information; and
a fingerprint sensor package configured to sense a fingerprint of a user and transmit a signal regarding a sensing result to the security chip,
wherein the fingerprint sensor package comprises:
a package substrate having an upper surface in which a sensing region and a peripheral region surrounding the sensing region are defined and a lower surface facing the upper surface;
a plurality of first sensing patterns that are in the sensing region, are apart from each other in a first direction, and extend in a second direction crossing the first direction;
a plurality of second sensing patterns that are in the sensing region, are apart from each other in the second direction, and extend in the first direction;
a coating member covering the sensing region;
an upper ground pattern that is in the peripheral region and apart from the coating member to surround the coating member in the first and second directions; and
a plurality of capacitors, and
wherein the plurality of first sensing patterns and the plurality of second sensing patterns are apart from each other in a third direction perpendicular to the first and second directions such that each capacitor from among the plurality of capacitors includes a sensing pattern from among the plurality of first sensing patterns as a first conductor and a sensing pattern from among the plurality of second sensing patterns as a second conductor.

17. The smartcard of claim 16, further comprising:
a plurality of connection pads on the lower surface of the package substrate; and
a controller chip connected to some of the plurality of connection pads and configured to determine whether a recognized fingerprint corresponds to a registered fingerprint.

18. The smartcard of claim 17,
wherein the fingerprint sensor package is mounted in the card main body such that the coating member and the upper ground pattern are exposed to the outside, and
wherein the controller chip is in the groove area.

19. The smartcard of claim 18, wherein each of corners of the package substrate has a round rectangular planar shape.

20. The smartcard of claim 18,
wherein the upper ground pattern is configured to remove sensing noise generated by a user,
wherein the upper ground pattern is located along a planar shape of the coating member, and
wherein the upper ground pattern includes at least one of a closed line pattern having a uniform width, a plurality of circular patterns that are apart from each other, or a plurality of quadrangular patterns that are apart from each other.

* * * * *